Nov. 25, 1958

C. R. HANNA ET AL 2,861,550

HYDRAULIC POWER CONTROL VALVE

Filed Oct. 28, 1952

WITNESSES:
Robert C Baird
E. F. Oberheim

INVENTORS
Clinton R. Hanna &
Lawrence B. Lynn.
BY
Paul E. Friedmann
ATTORNEY

Nov. 25, 1958

C. R. HANNA ET AL 2,861,550

HYDRAULIC POWER CONTROL VALVE

Filed Oct. 28, 1952

WITNESSES:
Robert C. Baird
E. F. Oberheim

INVENTORS
Clinton R. Hanna &
Lawrence B. Lynn.
BY
Paul C. Friedemann
ATTORNEY

Nov. 25, 1958   C. R. HANNA ET AL   2,861,550
HYDRAULIC POWER CONTROL VALVE
Filed Oct. 28, 1952   11 Sheets-Sheet 5

WITNESSES:
Robert C. Baird
E. F. Oberheim

INVENTORS
Clinton R. Hanna &
Lawrence B. Lynn.
BY
Paul E. Friedemann
ATTORNEY

Nov. 25, 1958    C. R. HANNA ET AL    2,861,550
HYDRAULIC POWER CONTROL VALVE
Filed Oct. 28, 1952    11 Sheets-Sheet 6

WITNESSES:
Robert C. Baird
E. H. Oberhein

INVENTORS
Clinton R. Hanna &
Lawrence B. Lynn.
BY Paul E. Frickemann
ATTORNEY

Nov. 25, 1958

C. R. HANNA ET AL 2,861,550

HYDRAULIC POWER CONTROL VALVE

Filed Oct. 28, 1952

WITNESSES:
Robert G. Baird
E. L. Oberheim

INVENTORS
Clinton R. Hanna &
Lawrence B. Lynn.
BY
Paul E. Friedemann
ATTORNEY

Nov. 25, 1958

C. R. HANNA ET AL 2,861,550

HYDRAULIC POWER CONTROL VALVE

Filed Oct. 28, 1952

WITNESSES:

INVENTORS
Clinton R. Hanna &
Lawrence B. Lynn.
BY
ATTORNEY

Nov. 25, 1958   C. R. HANNA ET AL   2,861,550
HYDRAULIC POWER CONTROL VALVE
Filed Oct. 28, 1952   11 Sheets-Sheet 11

WITNESSES:
Robert C. Baird
E. F. Oberhein

INVENTORS
Clinton R. Hanna &
Lawrence B. Lynn.
BY
Paul E. Friedemann
ATTORNEY

United States Patent Office 2,861,550
Patented Nov. 25, 1958

2,861,550
HYDRAULIC POWER CONTROL VALVE

Clinton R. Hanna and Lawrence B. Lynn, Pittsburgh, Pa., assignors to Westinghouse Electric Corporation, East Pittsburgh, Pa., a corporation of Pennsylvania Application October 28, 1952, Serial No. 317,215

20 Claims. (Cl. 121—46.5)

This invention relates generally to hydraulic devices and systems which are utilized in moving and/or controlling a body.

Apparatus of this general type frequently utilizes a power piston having a mechanical connection with the body to be controlled for controlling the movement of the body in dependence of movement of the piston. In some applications, force is applied to the body by the piston in one direction only, there being some other means for returning the body to a given neutral or starting position. In other instances, force is applied to the body in each of two directions by the piston to effect reversible movement of the body.

In such hydraulic drives fluid under pressure is supplied to the piston from a supply of fluid pressure through the medium of a system of valves which may be manually or automatically controlled to obtain the desired operation of the body. The requirements of such a drive may vary in certain respects from one application to another but as a general proposition it is desirable that high speed, high power performance be obtainable together with a minimum dead band in the vicinity of zero error. Moreover, a system such as this should be relatively stable, which indicates a degree of damping commensurate with system stiffness. Other important considerations in most applications include compactness, lightness of weight, ease of manufacture, serviceability and durability to mention a few.

Accordingly, one object of this invention is to provide a high-speed high-power hydraulic control.

Another object of this invention is to provide a hydraulic control having a negligible dead band about neutral position.

Yet another object is to provide a high speed control having a small dead band and low quiescent fluid flow for use with a source of hydraulic energy maintained at high pressure.

A further object of this invention is to provide a force-sensitive hydraulic control.

Yet a further object of this invention is to provide a force sensitive hydraulic control which is reversible if the force due to the load is greater than the force applied to the load by the hydraulic control and which is capable of further displacing the load if the load force should drop below the force applied to the load by the hydraulic control.

Further to the preceding object, it is an object of this invention to provide a hydraulic control in which force sensitivity is achieved by balancing output pressure against pilot or control pressures in one-to-one ratio, or otherwise, as required.

A more specific object of this invention is to provide a hydraulic control having a plurality of independent valves controlled by hydraulic pressures.

More specifically, with respect to the preceding object, it is an object of this invention to provide such a hydraulic control wherein the valves have as their operating means a hydraulic linkage which makes the valves self-adjusting.

Still more specifically, it is an object of this invention to provide a hydraulic control of the character mentioned in which all of the valves employed therein are of the seated type.

It is also an object of this invention to provide a hydraulic control of the character referred to in which average system pressures may be set for optimum performance.

An ancillary object of this invention is to provide a hydraulic control device which is easily manufactured and which has a long useful life requiring a minimum of maintenance.

Yet another object of this invention is to provide a hydraulic control of the character referred to which is adequately damped.

More specifically, it is an object of this invention to provide a magnetically controlled hydraulic control as generally mentioned in which system damping is achieved at the magnetic means.

Further to the preceding object, it is also an object hereof to provide a movable magnetic means in a hydraulic control, for controlling fluid flow, in which movement of the magnetic means is damped.

Additionally, it is an object hereof to provide a magnetically operated valve in which movements of the valve control member are damped.

In respect of the preceding object, it is an object hereof to provide a magnetic controller or driver for a member to be controlled in which the driver or movable member is biased to a given position and movement therefrom is damped.

The foregoing statements are merely illustrative of the various aims and objects of this invention. Other objects and advantages will become apparent from a study of the following disclosure when considered in conjunction with the accompanying drawings, in which:

Figure 1 schematically illustrates a hydraulic device and system embodying the principles of this invention;

The apparatus illustrated in Figs. 1 through 5 of the drawings is of a schematic nature and is presented primarily for the purpose of clearly illustrating the general principles of this invention. The arrangements illustrated in these figures are not intended to represent practical physical arrangements of such a system, this aspect being covered in Figs. 6 through 11 and 12 through 16 of the drawings covering different embodiments.

Figure 1:
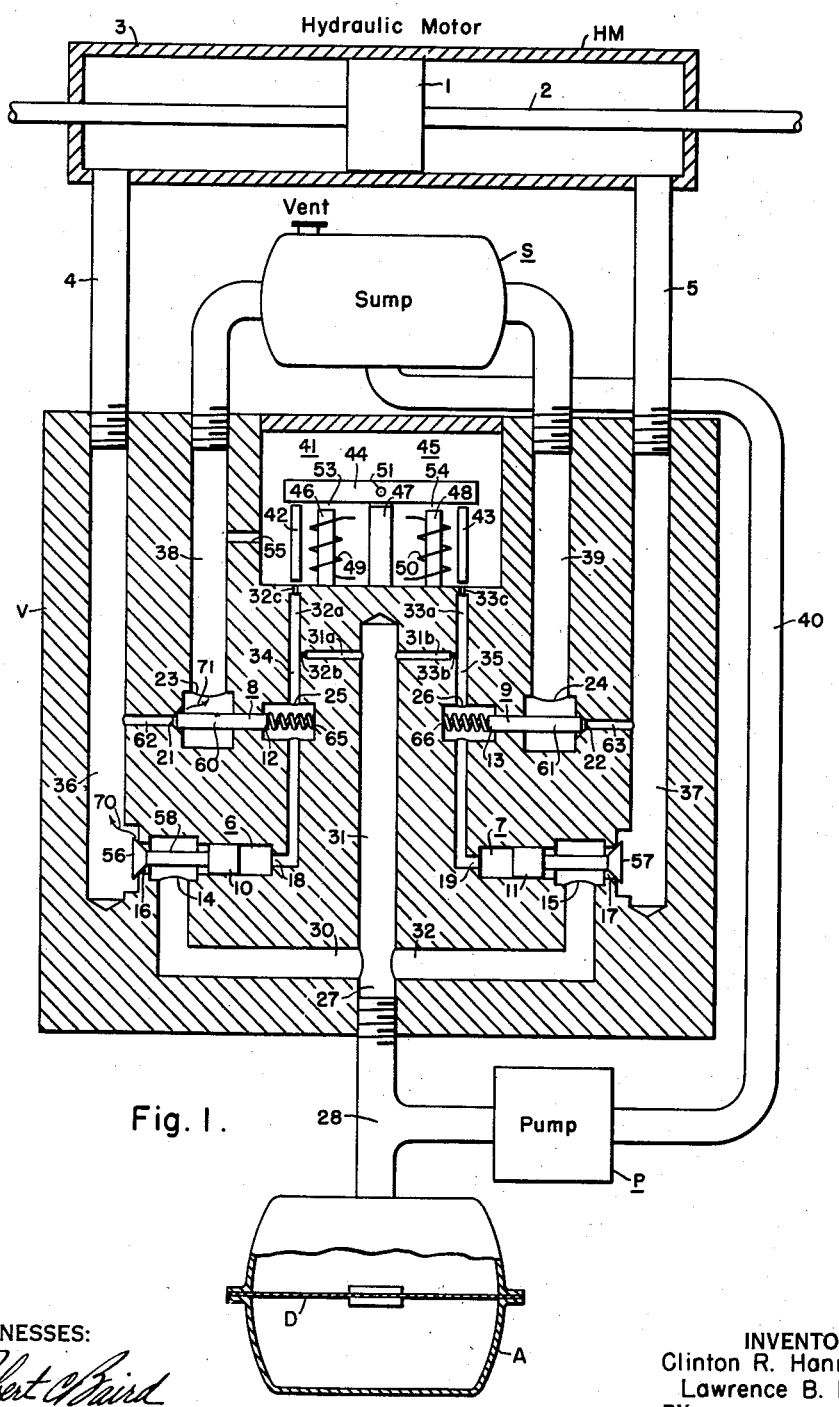

In Fig. 1, a hydraulic motor or power piston HM is connected to a hydraulic valve system V to be controlled thereby. This motor is of the double acting type comprising a piston 1 connected to a piston rod 2 and slidably mounted within a cylinder 3. Fluid connections to opposite ends of the cylinder are obtained through fluid conductors 4 and 5. The particular load which is to be controlled by the hydraulic motor is not illustrated herein in the interest of simplicity.

The valve system for controlling the power system comprises four power valves which are respectively designated 6, 7, 8 and 9. These valves are comprised of respective pairs of inlet or supply valves 6 and 7 and outlet or discharge valves 8 and 9. The fluid system is supplied with fluid pressure from a sump S by means of a pump P preferably having a substantially constant output pressure. Such a pump may be any one of several well-known variable displacement type pumps or may be, for instance, a constant displacement type of pump having a pressure sensitive valve connection in the output in turn having a connection around the pump to the input side of the pump so that the fluid pressure at the output side of the pressure sensitive valve may be maintained substantially constant. Excess fluid flow with this arrangement is simply circulated around the pump. The output of the pump is applied to a conventional type of accumulator, generally designated A. Such an accumulator is sometimes made of two flanged hemispherical-shaped members having a flexible diaphragm, such as D, secured between the sealed flanges. The diaphragm is preloaded by means of gas (usually nitrogen) pressure in the bottom section of the accumulator. For example, if the system pressure is in the neighborhood of 1,000 pounds, the diaphragm preloading may be of the order of 500 pounds per square inch. Thus, when the fluid output of the pump is applied to the system, the diaphragm, at the time the mentioned thousand pounds per square inch pressure is reached in fluid pressure, will usually occupy a position substantially as illustrated.

Each of the four power valves are of the piston operated type, inlet or supply valves 6 and 7 being provided with pistons 10 and 11 and outlet or discharge valves 8 and 9 being provided with effective piston sections 12 and 13, respectively. Inlet or supply valves 6 and 7 are respectively provided with inlet ports 14 and 15, and output ports 16 and 17, respectively, and control ports 18 and 19, respectively. Similarly, discharge valves 8 and 9 are provided with inlet ports 21 and 22, respectively, outlet or discharge ports 23 and 24, respectively, and control ports 25 and 26, respectively.

The accumulator A is connected with the pump and with an inlet conductor 27 in the hydraulic valve system through a T-connection 28. The inlet conductor 27 is divided into three inlet branches, respectively, designated 30, 31 and 32. Branches 30 and 32 are connected to respective inlet ports 14 and 15 of inlet or supply valves 6 and 7 while inlet branch 31 is connected to respective control conductors 31a and 31b having respective branches 34 and 35 which respectively connect to control ports 18 and 25 of the power valves on one side of inlet branch 31 and control ports 19 and 26 of the power valves on the opposite side of inlet branch 31. Outlet conductors 36 and 37 are respectively connected to outlet ports 16 and 17 of inlet or supply valves 6 and 7 and at their other ends connect respectively with conductors 4 and 5 in the opposite ends of cylinder 3. Discharge conductors 38 and 39 connect with respective discharge ports 23 and 24 of the discharge or outlet valves 8 and 9 and are both connected to pass fluid into the sump S from the valve system. A fluid conductor 40 carries fluid from the sump to the inlet side of the pump for recirculation in the system. Branch portions 32a and 33a of control conductors 31a and 31b, respectively, are connected by small orifices 32b and 33b, respectively, to the fluid supply. These are fixed orifices which together with the controllable exhaust pilot valves provide regulated pressure dividing networks. The center sections at 32a and 33a, respectively, of these pilot circuits supply the control pressures applied to the power valve pistons, which is the control pressure appearing in the control ports of the respective power valves. The actual control pressures are controlled, according to one method herein illustrated, by means of a small magnetic controller or driver generally designated 45.

In this arrangement, the upper ends of control conductors 32a and 33a respectively communicate with a cavity 41 across small modulating valves 32c and 33c, flow through these valves being regulated by the vertical position of respective valve members 42 and 43 which are controlled by armature 44. The vertical position of these respective valve members depends upon the angular position of the armature 44 against which they bear and is the position in which the hydraulic forces acting on the valve members comes into equilibrium with the forces of the magnetic driver, specifically those applied by armature 44.

More in detail, the electromagnet device 45 comprises a three-legged magnetic circuit represented in the legs 46, 47 and 48. Coils 49 and 50 are disposed about the respective outer legs 46 and 48. Armature 44 is pivotally attached by a pin 51 to the upper portion of the center leg 47 of the core. With this arrangement, by selectively energizing the respective coils 49 and 50 or by varying the relative magnitude of simultaneous excitation of these coils, an unbalance of flux in the three-legged core is obtained resulting in a higher concentration of flux, for example, in the air gap 53 between the armature and the upper end of core 46, than exists in the corresponding air gap 54. A counterclockwise torque is, therefore, applied to the armature 44 which tends, therefore, to drive the valve member 42 downwardly restricting the area for the discharge of hydraulic fluid through the valve orifice at 32c into the cavity 41 thereby raising the pressure in conductor 34. At the same time, valve member 43 may be thrust upwardly by the fluid impinging on the bottom end thereof and the fluid passing through orifice 33c may, therefore, rise in its rate of efflux lowering the pressure in conductor 35. This fluid, which is flowing from the inlet branch conductor 31 through respective control conductors 31a, 31b, 32a and 33a into the cavity 41, is discharged through a conductor passage 55 into discharge conductor 38 from which it is returned to the sump.

The design of the respective inlet or supply valves 6 and 7 is such that the accumulator pressure appearing at the inlet port has little or no effect upon their opening. Referring, for example, to supply or inlet valve 6, this valve is provided with a valve closing member 56 which is connected by means of an integral rod portion 58 to the piston 10. The cross sectional area of the port 16 with respect to the cross sectional area of the piston 10 is such that when the valve 56 is closed under quiescent conditions, the area of the back portion of valve 56 subjected to inlet fluid pressure corresponds closely to the area of the right face of piston 10 which is subject also to inlet pressure. In view of this substantial equality of area in this instant application, it will be appreciated that the inlet pressure or the accumulator pressure will have little or no effect upon the opening of this valve. Similar considerations apply to inlet valve 7 wherein the area of valve 57 when closed is essentially in one-to-one relation with the area of the confronting end face of the piston 11. From this, it will be appreciated that any increase in the control or pilot pressure appearing at respective inlet ports 18 and 19 of the inlet valves will cause opening of the valves. With the system arranged as illustrated, such a valve when opened will tend to remain open until pressure in the outlet conductor, such as 36 for example, leading to the left end of cylinder 3 rises substantially to the level of the control or pilot pressure, or slightly higher, in order to overcome frictional valve drag, at which time the valve will tend to close.

Exact area balance between the back face of the valve member of the power valves and the piston is probably never obtained, and is not a requirement for operation. Unbalanced areas affect performance by imposing a dead band to produce steady flow or retarded flow, as unbalancing differential output pressures.

As earlier described, the respective pistons 12 and 13 of the discharge or outlet valves are operated by the same respective control or pilot pressures which control the supply or inlet valves in one-to-one relation to the outlet or cylinder pressure. This will be appreciated by an examination of the respective valve members 60 and 61 of discharge valves 8 and 9. As illustrated, these are of constant diameter throughout their length. Referring, for instance, to the discharge valve 8, the inlet port of this valve communicates through a conductor 62 with the outlet conductor 36. Outlet conductor 62 terminates in a valve seat at the inlet port 21 which is closed by the left-hand end of valve member 60. The area at the left end of member 60, it being of constant diameter along its length, corresponds approximately to the area at the right end which is subject to the pilot pressure. Thus the cylinder pressure or the pressure in outlet conductor 36 is balanced in substantially one-to-one relation against the pilot pressure which is applied to the opposite end of valve member 60. In a similar manner, the inlet port 22 of discharge valve 9 is connected to outlet conductor 37 by means of a conductor 63 terminating in a valve seat receiving the right end of valve member 61. Here again, the outlet pressure or cylinder pressure is balanced against the pilot pressure for the discharge valve 9 across the valve member 61. Thus in any instance in which the cylinder pressure rises above the pilot pressure, the discharge valve subjected to such pressure unbalance is opened and fluid from the outlet conductor connected thereto may be discharged through that valve.

To insure that the respective discharge valves are able to hold pressure in the cylinder 3 while fluid is being admitted, a slight biasing force may be applied to the respective valve members 60 and 61 of the discharge valves acting in the same direction as the pilot pressure, that is, acting in a direction to close the respective discharge valves. Such a biasing force may be applied in each case by respective springs 65 and 66 which need not apply a very high force. In one practical embodiment of this invention, it was found that such a biasing force, requiring only a 50 pound per square inch fluid balancing pressure, was satisfactory in a system having a 1,000 pound per square inch accumulator pressure. The introduction of such a biasing force does introduce a small uncertainty dead band about the neutral position. However, this is extremely small when compared with the total range of over 1,000 pounds per square inch and for all practical purposes is negligible.

Considering now a typical operating condition of the system in which the magnetic bias on the armature introduces counterclockwise armature movement, it will be seen that the pilot or control pressure in conductor 34 will increase while the pilot or control pressure in conductor 35 will tend to decrease. This increase in pilot pressure in conductor 34 is transmitted to the piston 12 of discharge valve 8, tending to more securely seat this valve in closed position, and to the piston 10 of inlet or supply valve 6. At the same time, the fluid pressure acting on piston 13 is reduced in essentially the same amount as that on the piston 12 was increased, reducing the fluid pressure required for causing the discharge valve 9 to move to open position. Due to the increase in pressure acting on the right face of piston 10 as viewed, valve 56 is unseated from its valve seat and fluid under pressure flows from conductor 30 through the inlet port 14 through outlet port 16 to outlet conductor 36 to the left side of cylinder 3. This forces the piston 1 to the right as viewed and fluid is exhausted from the right half of the cylinder through conductors 5 and 37 to conductor 63 and the inlet port 22 of discharge valve 9. From the outlet port of this latter discharge valve, the fluid passes through conductor 39 to the sump from which it is returned by conductor 40 through the pump P to complete the fluid cycle.

Assuming that the piston rod 2 is connected to a load, it will apply a force to the load in the magnitude and direction indicated by the degree and sense of magnetic unbalance of the magnetic controller. This output force persists as long as a pilot or error signal is applied to the magnetic controller. If the system herein described is being employed to control a body, such as in an azimuth or elevation drive for a gun, for instance, and some form of manually operated excitation control were employed to control the coils of the magnetic controller, then when the body being moved or controlled has reached the desired position, the signal may be removed from the magnetic controller at which time the fluid pressures acting in opposite senses on the mechanical system of the magnetic controller tend to bias this device to neutral position. At this time, the pilot pressures return to their initial values under which condition the pilot pressure in conductor 35 increases as the pilot pressure in conductor 34 decreases until the respective pilot pressures are theoretically equal. Thus the pressure of the fluid in the right side of cylinder 3 increases to the level of the pilot pressure plus the pressure required to deflect the spring 66 which biases the valve member 61 of discharge valve 9. However, the piston 10 of inlet or supply valve 6 is unbiased and is acted on by a pilot pressure which equals the pilot pressure in conductor 35. The fluid flowing through inlet conductor 30 and outlet conductor 36 to the left side of cylinder 3 comes from the high pressure accumulator. Thus the pressure in the left side of cylinder 3 rises rapidly and at the time this cylinder pressure exceeds the pilot pressure, the force acting on the left face of piston 10 rises above that acting on the right face of the piston 10, and the piston moves in a direction to close the valve. At this time the cylinder pressure is substantially equal to or approaching the pilot pressure and inlet or supply valve 6 is essentially in a hovering condition at closed position.

In the arrangement hereinabove described, the only sliding fits which are utilized to prevent fluid flow from one cavity to an adjacent cavity is that, for instance, involving the sliding fit of a piston 10 into the corresponding cylinder in which it operates. However, it will be appreciated that such sliding fits as are involved between a piston and its cylinder wall are quite long as compared to the permissible overlap of lands in spool valve arrangements. Therefore, it is not necessary in the fitting of the piston into the cylinder to work to the close tolerances that have been required in the fitting of spool valves. Moreover, the use of seated valves such as herein disclosed provides ideal sealing at the several locations of fluid flow.

In the use of apparatus such as illustrated in Fig. 1, in stabilizing a tank gun for example, the power piston may be connected to drive the tank gun in elevation. In a stabilizing application such as this, suitable sensing means are utilized to detect the rate of angular movement of the gun and/or to detect the displacement of the gun with respect to a given angular position in space. Devices for sensing such movement may be, among others, respectively, rate gyroscopes and position type gyroscopes. Assuming that angular rates alone are detected, the output of a rate gyroscope in terms of a suitable electrical quantity, produced by a gyro-actuated electrical pick-off device, is applied to the coil system of the magnetic controller 45 in any one of several well-known circuit arrangements.

If the error quantity is such as to effect counterclockwise movement of armature 44, the piston, 1, as previously described, will be thrust towards the right as viewed to apply a force to the gun about its trunnion axis in a sense to counteract the velocity error. When the angular rate of the gun about its trunnion axis is checked, the signal of the rate gyroscope drops to zero. At this instant, the armature of the magnetic controller tends to assume its neutral position under the influence of the hydraulic forces acting at the ends of the valve members 42 and 43, after which, as previously described, the fluid pressure in outlet conductor 36, which at this time is higher than the pilot pressure acting on the right side of piston 10 as viewed, causes the valve 56 to close. Thus, a displacement of the gun about its trunnion axis with respect to the main body of the tank has taken place in an amount sufficient to maintain the elevation angle of the gun substantially constant regardless of the fact that the actual angle of the gun and the tank body about the trunnion axis has changed.

Due to the fact that the gun has a relatively high inertia and is mounted in trunnions having relatively low friction, the gun will of itself in a certain degree tend to hold a fixed elevation angle when the tank body pitches. Since the present system is force responsive maximum advantage is taken of this self stabilizing tendency of the gun. The power required of the system for stabilization is primarily that needed to overcome the velocity coupling and friction. The velocity coupling is caused by the dynamic flow stiffness of the power valves and is a desirable inherent characteristic of such a system. This coupling characteristic will be understood from later considerations herein concerning velocity damping.

In the application of this invention to a gun drive, a rate sensitive device, such as a gyro having a pick-off device controlling the excitation of the coils 49 and 50 of the magnetic controller, detects angular rates of the gun, for instance, about its trunnion axis. Upon the occurrence of an angular rate about the trunnion axis, the pilot pressures are changed to introduce fluid into the cylinder in a direction to check the mentioned angular rate and to afford ready discharge of the fluid through the discharge valve connected to the side of the cylinder which is diminishing in volume.

In applications of an apparatus such as this in moving the control surfaces of an aircraft, the force sensitive feature of this application offers some important advantages. Such advantages are represented in the behavior of this hydraulic system under load. For example, assume a condition in which the piston 1 has been moved to the right, as viewed, to deflect a control surface of an aircraft, such as the rudder, in accordance with a given unbalance in excitation of the respective coils 49 and 50 of the magnetic controller. For a given degree of unbalance in such excitation, the control or pilot pressure acting on piston 10 is a corresponding value. Consequently, the force exerted by the rod 2 on the control surface control arm will build up to such a value as will exist at the time the outlet fluid pressure approaches or reaches the pilot pressure acting on the right side of piston 10. Assuming a constant loading on the control surface for a given angle of deflection, the deflection of the control surface will continue until such time as the force applied to the rod 2 by the control arm due to the control surface load balances the force applied to the control arm by the rod. In this condition of force equilibrium, surface deflection stops and the magnitude of this force and consequently the amount of deflection depends upon the magnitude of the pilot pressure which, in turn, is controlled by the unbalanced excitation of the coils of the magnetic controller.

Sudden gust loading of any surface whether deflected or undeflected and particularly if deflected can result in excessive strains in the air frame and in the servo mechanisms controlling the control surface in question. In the instant application, excessive strain is minimized due to the reversibility feature of the drive resulting from force sensitivity and the general arrangement of the valve system which permits the actuator piston to be displaced towards neutral from its displaced position under such conditions.

For the assumed condition in which the piston 1 is displaced toward the right as viewed, excessive loads on the control surface will tend to drive the piston towards the left. When this force increases above the pilot pressure by that small amount required to overcome friction and the force of spring 65 acting on valve member 60, the discharge valve opens and discharges the fluid from the left side of the cylinder through discharge conductor 38 to the sump. Thus the control surface is permitted to deflect in a direction towards neutral, tending to minimize the effect of gust loading. At the same time, the pressure in outlet conductor 37, due to the expanding right-hand portion of the cylinder 3, falls below the pilot pressure of the control or pilot conductor 35. Thus inlet or supply valve 7 opens and admits fluid from inlet branch conductor 32 to outlet conductor 37 and the right side of cylinder 3. When the gust loading disappears, the force of rod 2 on the control arm overbalances the reaction force of the control arm due to the control surface loading at this reduced angle of deflection. As a consequence, the control surface is returned again to a position in which the applied and reaction forces at the control arm are balanced. Inasmuch as the particular sources of any one of several control signals for controlling an aircraft and their manner of utilization in controlling the excitation of the respective coils of the magnetic controller are not essential to an understanding of this invention, neither they nor their circuits have been disclosed in the interests of simplicity.

In some applications damping of movement of the hydraulic cylinder or motor is required. There are several ways in which damping may be accomplished. For example, linear damper valves may be applied in the respective conductors 4 and 5 leading to the cylinder. With the present arrangement, however, damping may be conveniently obtained by using discharge or outlet valves 8 and 9 which are smaller in diameter than would ordinarily be chosen and providing unloaded stiff biasing springs 65 and 66, respectively, having a high rate of force build-up with deflection due to valve opening so that increasing discharge pressure as a function of discharge rate results. Of course, the increased discharge pressure requires a higher admitted pressure to the opposite cylinder and, therefore, an increased impedance over and above that of the driven cylinder load is obtained. This type of damping is definite and controllable by proper choice of valve dimension and spring rate. This, it will be appreciated, is a marked advantage over corresponding flow damping of a spool valve which is variable over wide limits as the spool valve opening varies.

Another factor which enters into the behavior of the valves herein illustrated, as regards their closing characteristics and which aids in closing the valves and augments velocity damping, deals with the flow characteristics of the fluid passing between the valve seat and that portion of the valve member adjacent to and including that portion which rides against the seat when the valve is closed. Although we do not wish to be limited by any particular theory or explanation of the closing forces which exist for the particular flow conditions herein, repeated tests have indicated that for fluid flow through the valve openings in the directions indicated by the respective arrows 70 and 71 adjacent the valves 6 and 8, respectively, which is in the direction of valve opening motion, that the valves will tend to close at a pressure somewhat less than that which would normally be required to keep the valves closed when fluid flow ceases.

In Figs. 2 through 5, only the valve mechanism is illustrated. It will be understood, however, that the corresponding fluid conductors of the respective embodiments in these figures may be connected in a system such as illustrated in Fig. 1. Consequently, explanations relating to the system hereinafter appearing in the discussions of these respective embodiments will be understood in connection with Fig. 1. Parts of these figures corresponding to those of Fig. 1 bear like reference characters.

Figure 2:
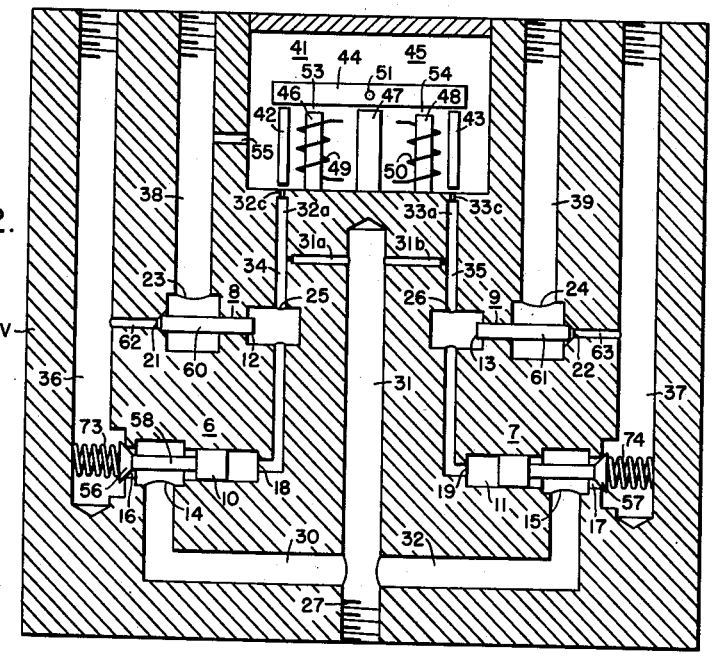
Figs. 2, 3, 4 and 5 are schematic illustrations of respective hydraulic valve systems each representing a different embodiment of this invention.

Referring particularly to Fig. 2, this figure differs from that embodiment illustrated in Fig. 1, in that the biasing springs 65 and 66 which bias the respective valve members 60 and 61 in a direction to close the discharge valves have been eliminated and springs 73 and 74 have been added to respective inlet valves 6 and 7 to bias these valves to closed position. Here again, assuming a supply pressure for the system of the order of 1,000 pounds per square inch, it has been found that spring forces requiring balancing system pressures of the order of 50 pounds per square inch and somewhat less, are adequate for the purposes. It may be well to mention at this point that the primary purpose of applying biasing springs either to the discharge valves as in Fig. 1 or the inlet valves as indicated in Fig. 2, is to offset the slight uncertainty of balance between the areas of the power valve members, for example, such as 56, and the piston areas resulting from tolerances permitted in machining. The addition of such a small spring bias ensures the proper closing of the valves. In the case as in Fig. 1, when these springs bear against the exhaust valves or discharge valves to hold them closed, the output pressures which are produced are slightly higher than the control or pilot pressures. These elevated output pressures positively close the inlet valves.

Positive closing of the power valves is also assured by placing springs such as 73 and 74 on the inlet valves to effect their closing. By so doing, the output pressures which are produced are lower than the pilot pressures to permit the relatively higher control pressures to close the exhaust valves. Here again, there is a small dead band on either side of the balanced pilot pressure valve, but in this case the average output pressures are reduced by the magnitude of the dead band pressure, that is, the pressure due to the force of the biasing springs, rather than raised, as is the situation when the springs are applied to the discharge valves. This type of biasing is preferred because it reduces the pressures which exist in the hydraulic motor or cylinder. This reduces stress at packings and in general tends to lower friction, both of which are relatively important considerations in aircraft servo applications.

In the operation of this apparatus, assuming coil excitation of the magnetic controller such as to effect counterclockwise rotation of armature 44, the pilot pressure acting on piston 10 increases to a point slightly above the pressure required to overcome the bias of spring 73 and the output pressure, at which time, valve 6 opens and admits fluid to the hydraulic cylinder or motor. The fluid exhausted from the cylinder as the piston is displaced passes through conductor 37 and conductor 63 through the inlet port of discharge valve 9 which now opens at the reduced pilot pressure and through the discharge port 24 to conductor 39 and the sump. Thus the force required to overcome the spring 73 is applied by the pilot pressure rather than the exhaust pressure of the cylinder and the average cylinder pressure is correspondingly reduced.

Figure 3:
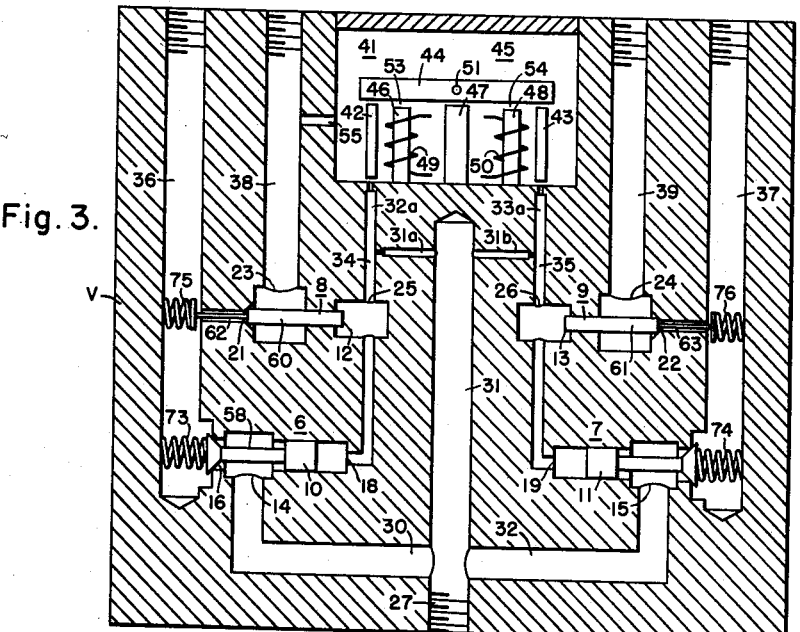
Figure 4:
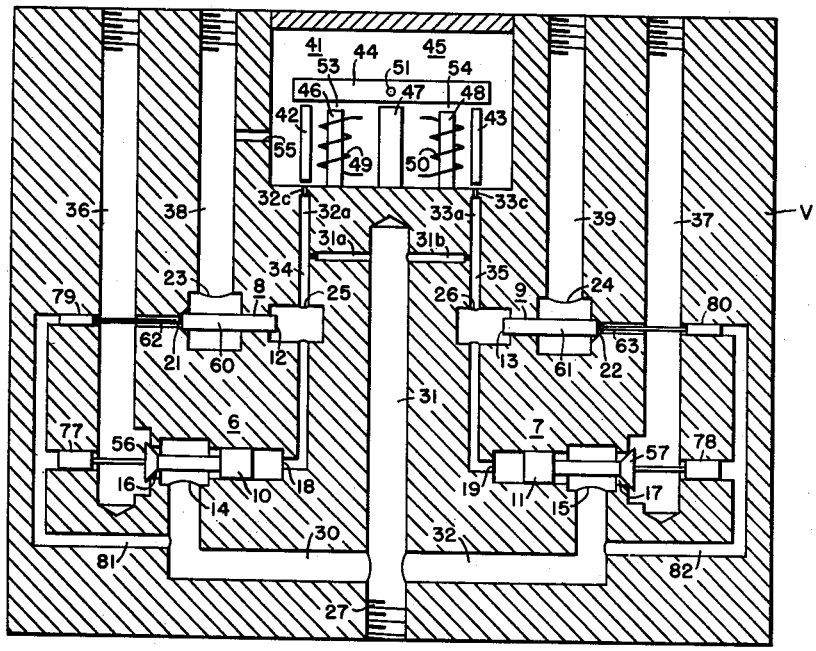

In the embodiment of Fig. 3, in which parts corresponding to those of Fig. 1 bear like reference characters, a further reduction in average output pressure is obtained by biasing both the inlet and the discharge valves. Optimum biasing forces are those which hold the inlet valves just closed and the exhaust valves barely open in the presence of average control pressure. In these considerations, it is assumed that the average control pressures are a fixed proportion of a regulated substantially constant pressure, such as for example is produced by a variable displacement pump or other type of pump having a regulated output pressure. In Fig. 3, the springs 73 and 74 bias the respective inlet valves 6 and 7 to closed position. Springs 75 and 76 bias the respective discharge valves 8 and 9 against the pilot pressures, that is, in a direction to open the discharge valves. Under these conditions, the average output pressures will theoretically be zero. However, the arrangement reduces the maximum output pressure by the magnitude of the average control pressure. This may represent a limitation of range and overall efficiency, since the average control pressures may be of the order of one-fourth of the system pressure. This type of control, which by analogy may be referred to as class C operation, has the advantage of high power output and is simple in arrangement. With the arrangement herein provided, the exhaust valves are held barely open in the presence of average control or pilot pressure. Consequently, upon a reduction in pilot pressure in a given control or pilot conductor, the affected discharge valve will open and consequently the fluid from the cylinder on the side of diminishing volume may be exhausted with a minimum amount of effort.

The limitation in range and overall efficiency due to the reduction of the maximum output pressure by the magnitude of the average control or pilot pressures in the arrangement of Fig. 3 may be corrected by a scheme of the type illustrated in Fig. 4 wherein again parts corresponding to those of Fig. 1 bear like reference characters. In this embodiment of the invention, pistons 77 and 78 are added, respectively, to inlet valves 6 and 7 and pistons 79 and 80 are added to discharge valves 8 and 9, respectively. These respective pistons are mounted in suitable cylinders associated with each and are connected by respective conductors 81 and 82 to have inlet fluid pressure applied thereto from inlet conductors 30 and 32, respectively, to bias the respective valves in a direction opposite to the biasing forces thereon due to pilot pressure. In this arrangement, no springs are utilized to effect closing of the respective power valves. Here the valve bias forces are proportional to the difference in the pressures of the system and output circuits. These forces are developed by pistons, one side of which is exposed to system pressure, for example, the inlet pressure existing in supply or inlet conductors 30 and 32 and the other side of which are exposed to output pressure, that is the pressures existing in respective outlet conductors 36 and 37 and are brought to bear directly on the respective valves. These auxiliary pistons have area ratios with respect to their corresponding valves approximately equal to the ratios of average control pressures or pilot pressures to system pressures. Slight deviation from exact equality between the respectively mentioned ratios is required to allow for tolerances in area balance and to insure proper sequential operation of the valves.

For quiescent conditions, assume that the average control pressure is one-fourth of the system supply pressure and that the auxiliary piston areas are about one-fourth that of their associated valves. Then with zero output pressures, all valve forces are balanced except for small residual biases which hold the inlets closed and the exhaust valves on the verge of opening. If now the control pressure on one side is raised by counterclockwise movement of the armature, the control pressure will pilot the power valves on that side to raise the output pressure and effect a simultaneous reduction of the bias forces.

More particularly, the increase in control pressure in control or pilot conductor 34 more securely closes discharge valve 8 and opens inlet valve 6. Opening of inlet valve 6 introduces the inlet pressure to the outlet conductor 36 and to the left side of the cylinder, as seen in Fig. 1. In view of the increase in pressure in outlet conductor 36, the differential bias existing as a result of the differential pressure on opposite sides of the piston 77 is decreased. In the limit with the control or pilot pressure equal to system pressure, the output pressure will also have reached system pressure and the bias forces will have been lowered to zero. Response within this full pressure range is substantially linear. In view of the biasing forces acting upon the piston 80 of discharge valve 9 due to the introduction of system pressure to the right side of piston 80, any slight increase in pressure of the fluid in conductor 37 due to diminishing volume of the right side of cylinder 3, as seen in Fig. 1, opens the discharge valve 9 to exhaust this side of the cylinder to the sump. With this arrangement, wherein controlled fluid biasing is provided for the respective power valves, push-pull class C output is obtained with full pressure range independent of system pressure.

The pilot or control valves 32c and 33c controlled by valve members 42 and 43 of the magnetic controller may be needle valves which seat in suitable recesses in the ends of metering orifices in valves 32c and 33c. Such devices are widely used and are well known. However, valves of this type are not completely satisfactory since they have been found to offer certain resistance to movement due to the centering action of the inclined surfaces as the needle valves move into approximate closing position. The performance at this point can be appreciably improved by using a valve member such as 42, having an end face normal to the axis of fluid flow, which seats upon a corresponding flat surface about the edge of an opening such as 32c. The positive closing stiffness of such a valve insofar as fluid forces are concerned, approximately obeys the square law as does the negative magnetic armature closing stiffness. These stiffness effects due to the geometry of the assembly are in opposition. The rate of change of valve stiffness is selected to be greater than the negative magnetic stiffness so that a net positive centering stiffness exists. This is accomplished by making the fluid gap at the valve smaller than the air-gap at the magnet armature.

Figure 5:
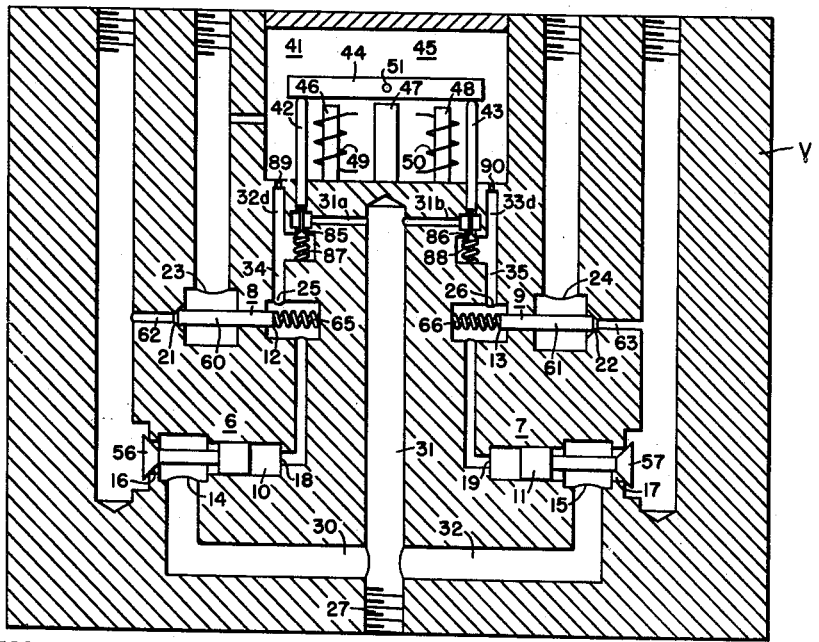

Although such a pilot valve arrangement as illustrated at 32c and 33c in the several embodiments hereinbefore described has been found to be satisfactory, certain improvements can be realized with the modified type of pilot valve construction illustrated in Fig. 5 wherein closed center seated valves are utilized. In this embodiment of the invention, two small admission valves 85 and 86 arranged for closed center operation control the pilot pressure. These valves may be biased to closed position, by light biasing springs 87 and 88 and are disposed respectively between the passages 32d and 31a on one side and 33d and 31b on the other side to control the admission of fluid thereinto for the purpose of controlling pilot pressure in the control or pilot branch conductors 34 and 35, respectively. These valves are, respectively, opened by counterclockwise and clockwise movement of armature 44 by selective magnetic biases at the magnetic controller. Exhaust orifices 89 and 90 respectively communicating between the cavity 41 and respective conductors 32d and 33d, permit a fall of pilot pressure by the communication afforded to the sump for the discharge of fluid from the pilot or control conductors. It is to be understood that, if necessary, suitable discharge valves may be utilized in place of orifices 89 and 90 to obtain any desired characteristic in the discharge of pilot pressure. In this application, these orifices are sufficiently large that control pressures are quite low when the inlet valves 6 and 7 are closed. The size of the orifices is determined primarily by the total leakage into the pilot pressure conductors or cavities, for example, such leakage as may come from the power inlet valve driving piston 10. When one of the admission valves, 85, for example, is fully opened, the pressure in the pilot conductors associated therewith rises to a value determined, for example, by the area ratio between inlet passage 31a and the associated exhaust orifice 89. Of course, any other pressure magnitude may be obtained in proportion to the driving force of the magnet which, in this instance, is working against the pilot pressure and the stiffness of respective biasing springs 87 and 88.

The advantage which is inherent in this system is that the average pilot pressure is quite low, resulting in low average cylinder pressure. Thus high friction in the hydraulic motor or cylinder, which is caused in many cases by high average cylinder pressure, is minimized due to the low average cylinder pressure. A system of the type illustrated in Fig. 1 requires an average pilot and cylinder pressure which is an appreciable fraction of the system pressure in order to obtain reasonably linear performance when the magnet armature is spring centered. With the arrangement illustrated in Fig. 5, class C operation results with good linearity. Another advantage inherent in a system utilizing seated type admission valves, as illustrated in Fig. 5 is that the control fluid flow is normally zero.

In this embodiment of the invention, assuming a bias on the control coils in a direction to effect counterclockwise armature displacement, the force of the armature due to the unbalanced magnetic pull results in displacement of valve 85 downwardly against the bias of compression spring 87 plus fluid pressure force on the pilot valve piston area. The amount of opening of the valve 12 is therefore determined by the magnitude of the opening force which is balanced against the spring force and piston force which thereby controls the volume rate at which fluid is admitted to the pilot or control conductors which, therefore, determines the control or pilot pressure. Under these conditions, inlet valve 56 is opened and the piston of the hydraulic cylinder is correspondingly moved. The exhaust of the side of the cylinder of diminishing volume is accomplished in this embodiment in essentially the same manner as illustrated in connection with Fig. 1.

Of the several different embodiments illustrated in Figs. 1 through 5, it has been found that that embodiment illustrated in Fig. 2 offers a simple yet practical solution to the problem of producing a satisfactory hydraulic valve system with a minimum of manufacturing complication and represents an arrangement having characteristics suitable for application in the control of hydraulic motors for a wide variety of applications. Accordingly, in the illustrations of Figs. 6 through 11 covering one practical embodiment of this invention, the principles embodied in the schematic illustration of Fig. 2 have been incorporated in the embodiment represented in Figs. 6 through 11.

Figure 11:
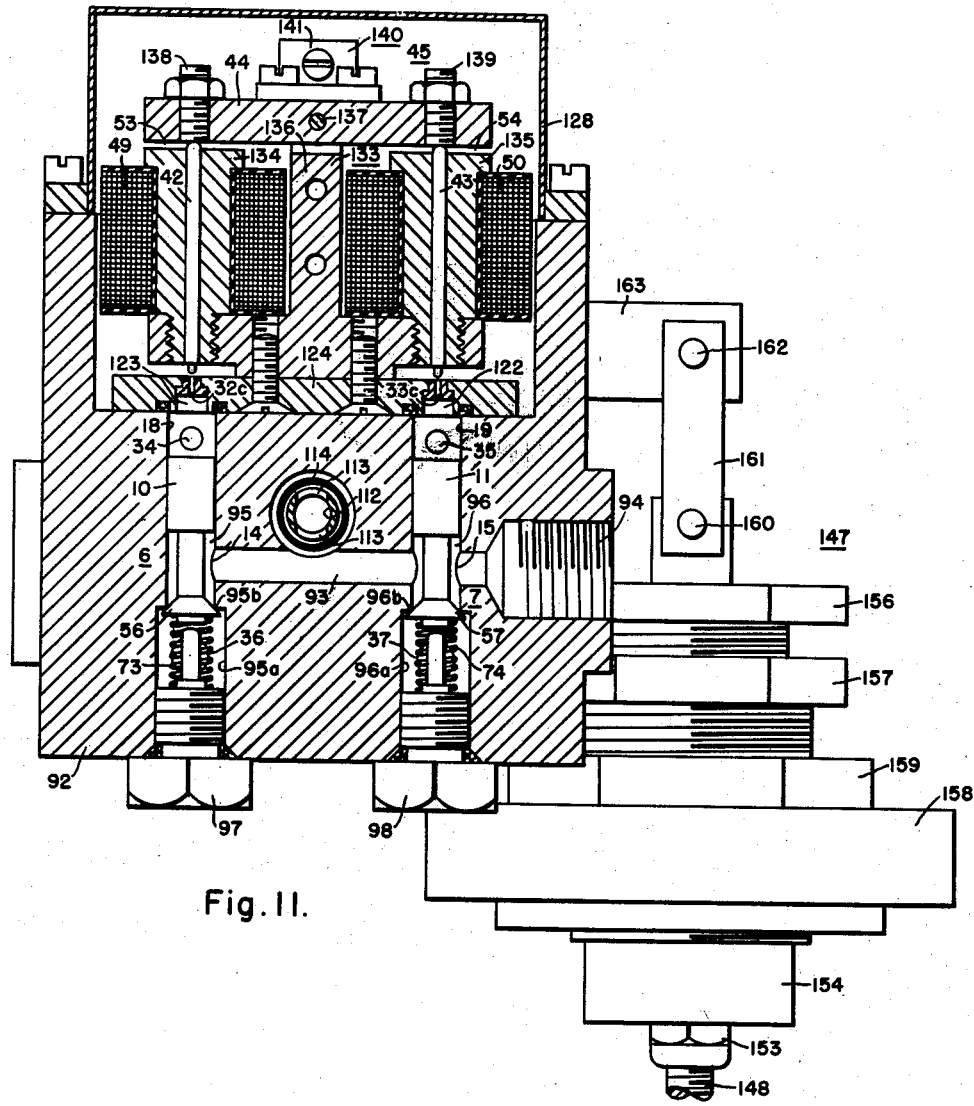
Fig. 11 is still another sectional view of the apparatus taken on a section line XI—XI indicated in Fig. 10.

In these figures, the body of the assembly is represented in a machined block designated 92. This valve body is drilled, as seen in Fig. 11, at 93 to provide a passage terminating in an internally threaded section 94 adapted for connection with a conductor system connected to an accumulator such as A in Fig. 1. As seen in Fig. 11, this passage is drilled through the side of the block in a horizontal direction. This passage is intercepted by a pair of openings 95 and 96 which are drilled vertically in the block and are of a diameter to receive respective pistons 10 and 11 of respective inlet power valves 6 and 7. Openings 95 and 96 are counterbored at the bottom of block 92 as indicated at 95a and 96a to form the valve seats 95b and 96b against which respective valve members 56 and 57 seat to close the valve. The bottom ends of these counterbored openings are drilled and tapped to receive screws 97 and 98, respectively, which seal the ends of these valve openings. Compression springs 73 and 74, respectively, are disposed between the screws 97 and 98 and respective valve members 56 and 57, to provide the slight spring closing bias on these valve members described in connection with Fig. 2.

Figure 8:
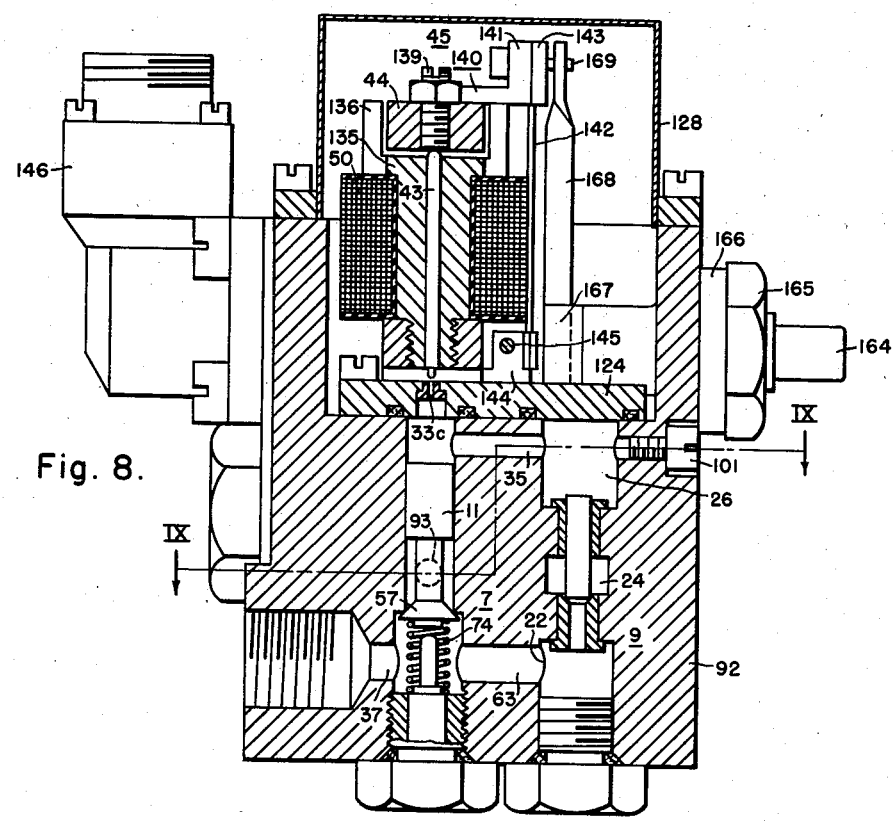
Fig. 8 is a sectional view of the apparatus taken on the line VIII—VIII of Fig. 6.
Figure 9:
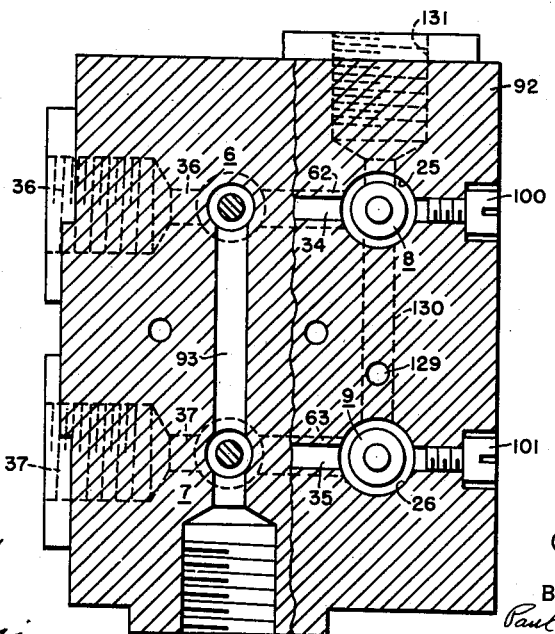
Fig. 9 is a another sectional view of the apparatus taken on a section line IX—IX indicated in Fig. 8.

The control or pilot pressure passages 34 and 35, respectively, open into the passages 95 and 96 in a position immediately above the respective pistons 10 and 11. These passages are drilled through a side of the block in a horizontal direction, as seen in Figs. 8 and 9. These respective control or pilot pressure passages 34 and 35 also intercept the control port of respective discharge valves 8 and 9. Thus provision is made through suitable passages in this block as thus far described to admit the inlet or system supply fluid under pressure to the inlet ports of the respective inlet valves and to admit the control or pilot pressure to the respective control ports of the power valves. The pilot pressure passages are sealed at the side of the block 92 by means of respective screws 100 and 101, which thread into the internally threaded ends of these passages.

The connection of the outlet ports of the respective inlet valves, which ports in this illustration are designated 95a and 96a, with the hydraulic motor to be controlled, is achieved by means of outlet passages or conductors 36 and 37 which are drilled through the side of the block 92 into the respective outlet ports 95a and 96a. These passages terminate in enlarged internally threaded sections adapted to receive standard tube connectors.

Figure 10:
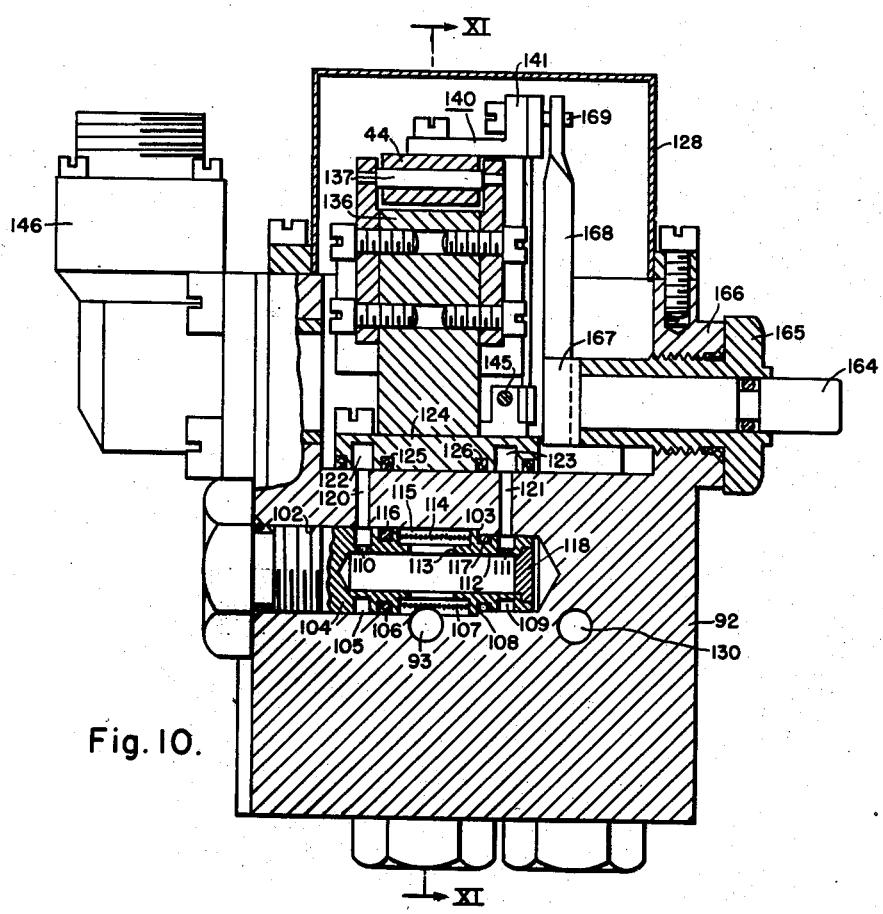
Fig. 10 is a sectional view of the apparatus taken on a sectional line X—X indicated in Fig. 6.

The control oil or hydraulic fluid is admitted to the respective control or pilot pressure conductors from the inlet conductor 93 by an arrangement wherein the control fluid is filtered to minimize the prospect of clogging the orifices in the control or pilot pressure conductors. To this end, as seen in Fig. 10, a suitable cavity 102 is drilled into a side of the block 92 in a position such that the bottom edge of this cavity intersects the upper side of the cavity 93 to provide communication therewith. Cavity 102 is counterbored along a portion of its length to form a shoulder 103 adjacent the right end, as seen in Fig. 10, and the left end of this cavity is internally threaded to threadedly receive the filtering and distributing plug 104. This plug is provided with respective axially spaced external annular recesses 105, 106, 107, 108 and 109 and is provided with an axially disposed hole 112 concentrically thereof which straddles the axial spacing of the several annular recesses described. Small holes 110 and 111 are drilled through the bottoms of annular recesses 105 and 109 into the axial hole 112 and a somewhat larger opening 113 is opened through the bottom of annular recess 107 to provide an opening into the hole 112. A wire screen 114 is disposed circumferentially in the recess 107 and covers the hole 113. As a consequence, any hydraulic fluid which is admitted into the cavity 115 between the wall of cavity 102 and the wire screen 114 must pass through the wire screen and through the hole 113 into the hole 112 whereby the hydraulic fluid is filtered. This assembly is secured in the cavity 102 by the mentioned threaded connection, and O-rings 116 and 117, disposed respectively in recesses 106 and 108, provide a seal for the hydraulic fluid in cavity 115 to prevent passage of this fluid therebeyond in either direction. The end of hole 112 is sealed by means of a plug 118.

Figure 6:
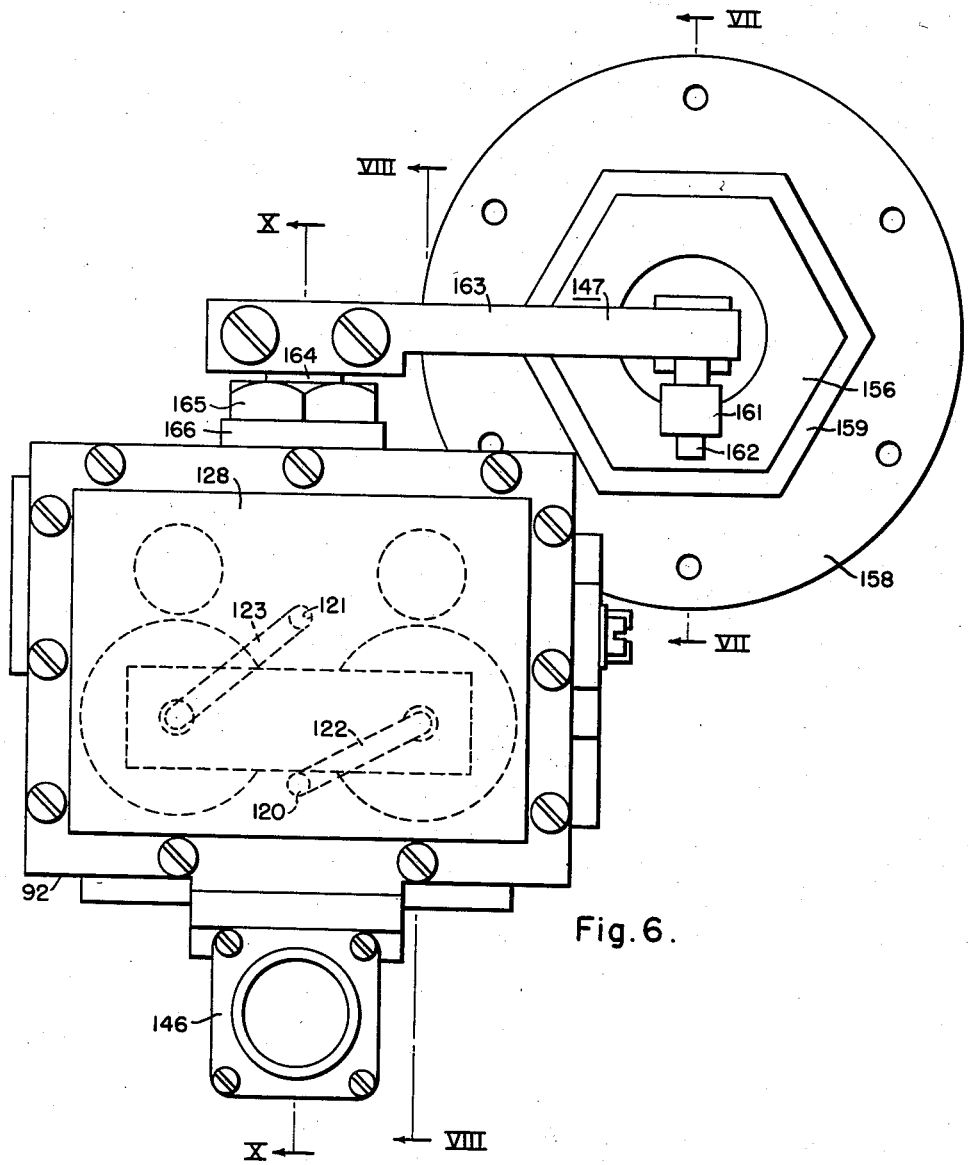
Fig. 6 is a plan view of a hydraulic valve system or device incorporating the principles of that arrangement illustrated in Fig. 2 and representing one practical embodiment of this invention.

The control or pilot pressure passages or conductors include the passages 120 and 121 which communicate between respective circular recesses 105 and 109 in plug 104 and the tops or faces of the block 92. A plate 124, see Figs. 6, 10 and 11, is mounted upon the top face of block 92 and is provided with slots 122 and 123 which communicate between respective passages 120 and 121 and respective control ports 19 and 18 of the inlet valves 7 and 6, respectively. These slots are sealed against the top surface of the block 92 in fluid tight relation therewith by means of respective gaskets 125 and 126 to provide a fluid-tight connection. At the point of termination of respective slots 122 and 123 at the control ports of inlet valves 7 and 6, respectively, small bushings 33c and 32c are fitted into plate 124 in holes which are formed through the top surface of this plate. These orifice bushings correspond to the orifice sections 33c and 32c, respectively, in Fig. 1, and are controlled by valve members 42 and 43 which are actuated by armature 44 of the magnetic controller 45 which is arranged on the top side of the block 92. This will be described in greater detail at a later point in this description.

Hydraulic fluid which is admitted to the passage or conductor 93 and which passes through the screen 114 into the passages 120 and 121 and then into the passages 122 and 123 enters the control ports of inlet valves 6 and 7 and, by way of conductors 34 and 35, also enters the control ports of the respective discharge valves 8 and 9. The control or pilot pressure in these separate branches is controlled as described in Fig. 1 by means of the valve members 42 and 43 of the magnetic controller which controls the flow rate of hydraulic fluid through the respective orifices at 32c and 33c, (see Fig. 11) and, hence, determines the pilot pressure. The control fluid which is thus admitted to the housing 128 of the magnetic controller is drained therefrom through an opening 129 extending between the top side of the block 92 and a discharge conductor or passage 130 which extends between the outlet ports of respective discharge valves 8 and 9, see Fig. 9. This passage terminates in an internally threaded portion 131 adapted to receive standard tube connectors.

In the arrangement herein illustrated, the magnetic controller comprises a three-legged core section including an inverted T-section 133 which is secured in inverted position to the top side of plate 124. The cores for respective coils 49 and 50 are designated 134 and 135 and are threaded at their bottom ends to thread into correspondingly threaded holes in the extremities of the cross arms of the inverted T-section. These core sections are spaced on opposite sides of the center leg 136 of the inverted T-section 133. Each of the coil cores is provided with an axial hole which respectively slidably receive the respective valve members 42 and 43 which control the pilot pressure. Armature 44 is pivotally fastened in the forked extremity of the leg 136 by means of a pivot pin 137, and set screws 138 and 139, which are coaxially arranged with respect to valve members 42 and 43 in opposite ends of armature 44, provide a means for adjusting the vertical position of the valve members 42 and 43 under fluid flow conditions when the armature 44 is in neutral or centered position to control and balance the pilot pressures.

Provision is made herein for mechanically centering armature member 44. The construction for accomplishing this includes an angle-shaped bracket 140 which is bolted to the top side of armature 44 in a symmetrical position with respect to pivot pin 137. Side 141 of this angle bracket is displaced to one side of armature 44, as seen in Fig. 8, and extends upwardly with respect to the armature. A centering spring 142 which may be a leaf spring or a small flat spring of suitable strength is clamped between a plate 143 and the side 141 of angle bracket 140 and extends downwardly, as seen in Fig. 8, where it is secured to a traveling nut 144 which is guided along the top surface of plate 124 and adjusted therealong by means of an adjusting screw 145 which shifts the bottom end of centering spring 142 with respect to the pivot pin 137 and consequently shifts the angular position of armature 44 thereabout. In this manner, the centering adjustment of armature 44 is conveniently made. Electrical connections for energizing the respective coils of the magnetic controller are brought in to the housing 128 by means of a standard electrical connector 146 which is L-shaped and has one face bolted against the side of block 92. Any suitable type of fluid tight connector may be used for this purpose.

Assuming that the fluid circuit has been connected in the manner indicated in Fig. 1, hydraulic fluid is then admitted to the supply conductor 93 and passes into the inlet ports 14 and 15 of the respective inlet valves 6 and 7, see Fig. 11. This fluid also passes through screen 114 and opening 113 into hole 112 in the filter bushing 104. From hole 112, see Fig. 10, the hydraulic fluid passes through holes 110 and 111 into passages 120 and 121 to the slots 122 and 123 in plate 124 and thence to orifices 32c and 33c, the control ports 18 and 19 of inlet valves 6 and 7, see Fig. 11, to passages 34 and 35, see Figs. 8, 9 and 11, to the control ports 25 and 26 of respective discharge valves 8 and 9.

Assume now that the armature is moved in a counter-clockwise direction, as seen in Fig. 11, the pilot pressure in the control port 18 of inlet valve 6 increases as the pilot pressure at control port 19 of inlet valve 7 decreases. Inlet valve 6 opens and the hydraulic fluid passes therethrough into conductor or passage 36, see Figs. 9 and 11, and is applied to the left side of cylinder 3, see Fig. 1. As the cylinder is displaced to the right, hydraulic fluid is exhausted therefrom into conductor 37, see Fig. 9, passing into conductor or passage 63 which is connected to the inlet port 22, see Fig. 8, of discharge valve 9. From this point, the fluid flows through the outlet port 24 of the discharge valve into conductor or passage 130 back to the sump which completes the fluid circuit.

Under certain operating conditions, it may be desirable to pilot the armature 44 by means which are independent of the excitation control for the magnet coils. Provision is made in this application, for example, through a linkage generally designated 147 to manually over-ride the magnetic control of armature 44. The details of this assembly appear in each of Figs. 6, 7, 8, 10 and 11.

An actuator member 148, which may be manually or otherwise suitably controlled, is indicated as a rod which extends through two oppositely disposed cup-shaped members 149 and 150 having a relatively stiff spring 151 disposed therebetween to bias the cup-shaped members away from each other. On the left end of rod 148, a shoulder 152 engages the cup-shaped member 149 and a nut 153 engages the cup-shaped member 150 and provides means for adjustably spacing these members with respect to each other to control the amount of spring loading. Cup-shaped members 149 and 150 are slidably mounted in a cylinder 154 having a shoulder 155 at its right end, as viewed in Fig. 7, which engages cup-shaped member 150 and limits travel towards the right. An externally threaded bushing 156 threads into the left end of cylinder 154 into a position abutting the end of cup-shaped member 149 and limits travel towards the left. When this bushing is adjusted to the proper position, it is locked by means of a nut 157. This assembly is securely mounted in a fixed plate 158 by threading the cylinder 154 into a suitably tapped hole in the plate. When properly positioned, the cylinder is locked to the plate by a nut 159.

The left end of rod 148 is connected by a pin 160 to a link 161 which at its other end engages a pin 162 in a lever arm 163. Lever arm 163 is best illustrated in Fig. 6. As seen in Fig. 6, the left end of lever arm 163 is clamped to a shaft 164 which extends through a suitable bearing sleeve 165 which threads to a base 166 which forms a part of the block 92. Shaft 164 terminates in a slotted head 167 which receives the bottom end of a flat strip 168, see Fig. 10, the upper end of which is twisted through an angle of 90° and is positioned adjacent the upwardly extending side 141 of the angle bracket 140 which is fastened to the top side of armature 44 as described. A pin 169 which is secured in the side 141 of the angle bracket fits through a suitable hole in the upper end of the flat strip 168 and provides a connection therewith. It will be noted by an inspection of either of Figs. 8 or 10 that the axis of pin 169 is parallel to and located above the axis of pivot pin 137 which pivotally mounts the armature. Thus, whenever the shaft 164 is rotated, the upper end of the flat strip 168 sweeps through a corresponding arc which displaces the pin 169 along an arc having as its center the axis of pin 137 and consequently tilts the armature in one direction or the other through a corresponding angle.

Figure 7:
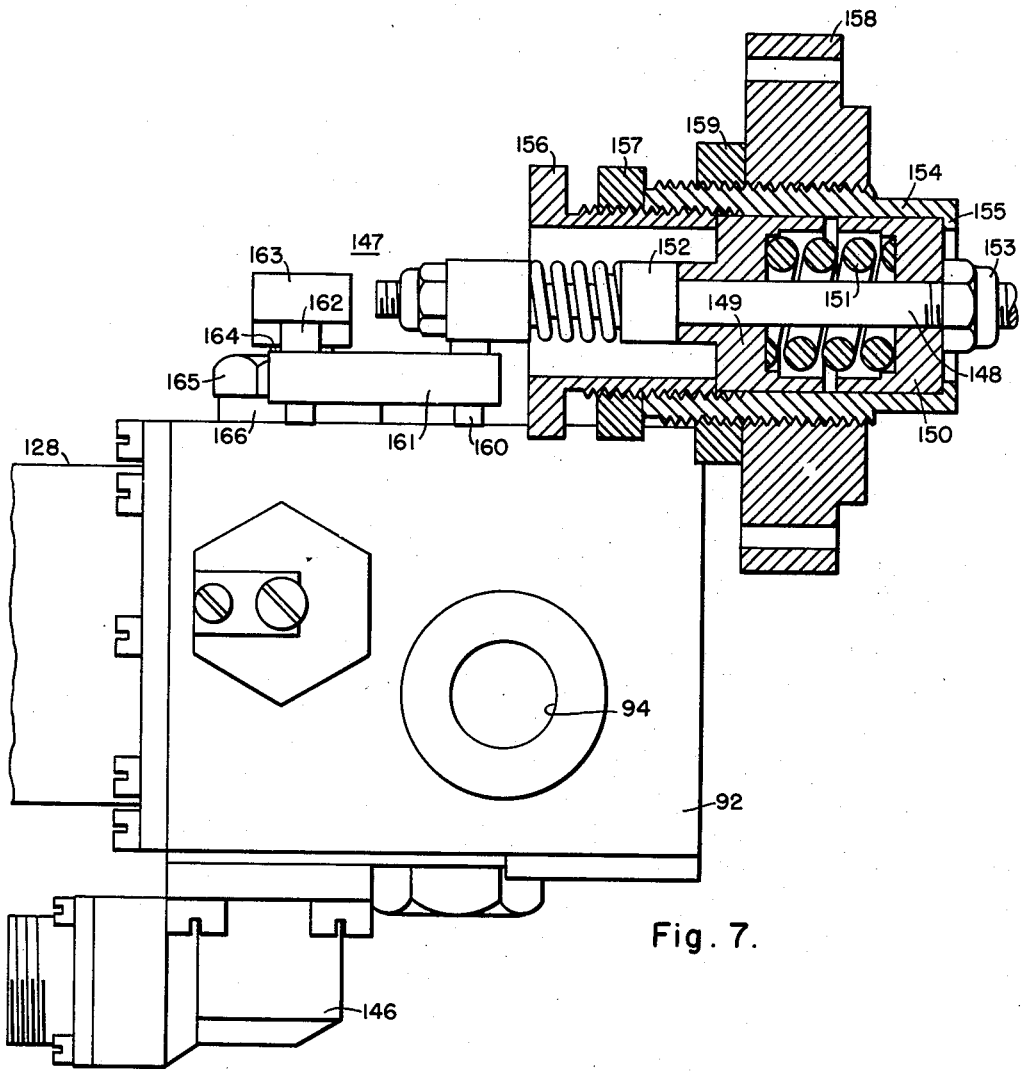
Fig. 7 is a sectional view of the apparatus taken on the line VII—VII of Fig. 6.

Thus referring to Fig. 7, if the rod 148 is displaced to the right as viewed, shoulder 152 bearing against cup-shaped member 149 acts against compression spring 151. If the force applied to rod 148 is sufficiently high, the spring is compressed and displacement of the rod occurs. This displacement rotates the right end of lever 163 into the plane of the drawing, as seen in Fig. 6, and consequently applies a clockwise torque to armature 44 as seen in Fig. 11. This displacement of the armature, therefore, actuates the valve control member 43 downwardly against the pressure of the hydraulic fluid passing through the orifice 33c while at the same time permitting valve member 42 to be moved upwardly with that side of the armature under the influence of fluid pressure acting against the bottom extremity thereof.

A control of this type is advantageous, for example, in aircraft applications wherein failure of the electrical equipment may result in loss of control of the hydraulic servo controlling the control surfaces.

There are several ways in which the valve may be mechanically tied into an aircraft control system. In one, the stick forces acting on the control cable are applied to the control surface using the valve as a fulcrum. That is, the mechanics is such that the cable force is transmitted to the control surface between actuating rod 148 and the valve body. The valve assembly moves as a unit when the cable loading is below the loading of spring 151. But when the control surface load loads the system in excess of the spring loading deflection of the armature of the magnetic controller occurs which introduces hydraulic assistance. Hence the boost ratio through the load range to unseat the loaded spring 151 is 1:1. When the loaded spring deflects the boost ratio increases.

By this expedient, through mechanical linkage of rod 148 with the manual controller of the aircraft, means are available to the pilot for manipulating the craft manually or with the hydraulic servo as dictated by system loads and maintaining control of the craft. When the loading is sufficiently high, the relatively stiff spring 151 is deflected and moves the armature of the magnetic controller to introduce hydraulic boost. Spring deflection imparts of degree of "feel" to the manual control and a degree of stiffness which gives the pilot the sense of manually moving the surfaces inasmuch as the force increases with the displacement of the spring much the same as the load increases on the control surfaces of the craft as they are displaced.

The dead band or force range over which the hydraulic boost is inoperative is determined by the loading of spring 151 and the boost ratio is determined by the increase of the spring rate. That is, the stiffer the spring and the higher the spring rate, the lower will be the boost ratio, because for a given force, the spring having the higher rate permits less unbalance in the pilot pressures.

Figs. 12, 13, 14, 15 and 16 illustrate a presently preferred embodiment of this invention. This embodiment of the invention includes certain improvements relating to structural details in the general assembly and to functional characteristics resulting from certain damping features which have been included. Considerations concerning the functional improvements will be made after the detailed description of the valve structure which follows.

In Figs. 12, 13, 14, 15 and 16 the valve body is again of generally rectangular configuration and is designated 174. The power valves include the two inlet valves 175 and 176 and the two discharge valves 177 and 178 in a manner similar to that of the preceding construction. The respective power valves 175 and 176 include valve members 179 and 180, respectively, which seal the respective outlet ports 191 and 192. These valve members are connected by respective stems 193 and 194 to respective operating pistons 195 and 196. The respective valve member assemblies move vertically in vertically disposed bores in the valve body, the pistons stroking in respective cylinder bores 197 and 198 and the valve members operating in respective counterbored sections 199 and 200 which are disposed beneath the respective outlet ports 191 and 192.

The fluid supply to these valves is applied from the accumulator, for example, an accumulator of the type illustrated in Fig. 1, to a supply passage 201 which extends horizontally of the valve body and intersects the bores 197 and 198 between the outlet ports 191 and 192, respectively, and the respective pistons 195 and 196. Thus, the supply pressure is applied between the bottom face of the respective pistons and the back faces of the respective valve members 179 and 180. As in that embodiment of the invention illustrated in Fig. 2, the inlet valve members are biased to seated position by respective biasing springs 202 and 203, which are disposed between the respective valve members 179 and 180 and respective screw plugs 204 and 205 which thread into and seal the bottom ends of respective counterbored sections 199 and 200. These springs are for the same purpose as described in connection with Fig. 2.

In the embodiment of the invention illustrated in Figs. 6, 7, 8, 9, 10, and 11 the supply fluid was admitted to the pilot valve system through a common fluid filtering and distributing device designated 104, as seen in Fig. 10. The hydraulic fluid was first filtered through a filtering screen and then divided into two separate passages for application to the pilot pressure system. This arrangement has been simplified and improved in this embodiment of the invention by longitudinally drilling pistons 195 and 196 providing passages 206 and 207, respectively, communicating with orifices designated 208 and 209 which extend laterally through the respective stems 193 and 194 into the piston passages 206 and 207, respectively. The orifices 208 and 209 each communicate with the supply passage 201 and thus permit fluid to pass through the pistons into the cavities above each of the pistons. The fluid which passes through the orifices is first filtered by respective screens 210 and 211 which are wrapped about and spaced from the respective stems of the valve member assemblies.

Figure 14:
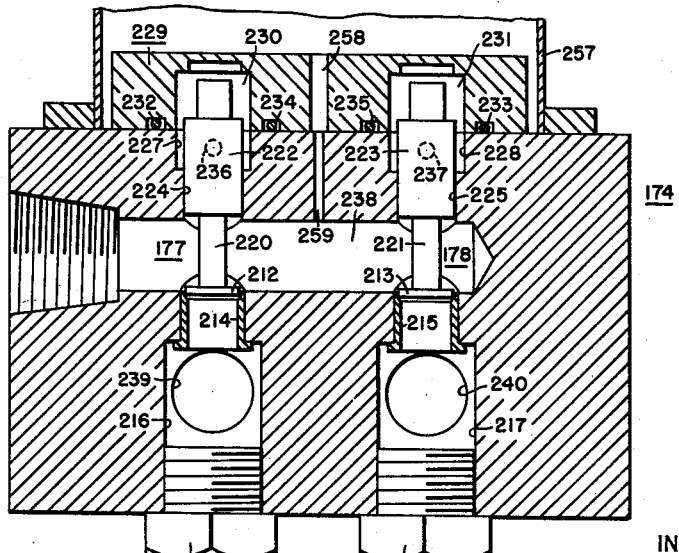
Fig. 14 is a sectional view of the lower portion of the valve, as viewed, taken on the line XIV—XIV of Fig. 12.

The discharge valve system is illustrated in Fig. 14. Discharge valves 177 and 178 include respective valve members 212 and 213 which close the inlet ports formed by respective bushings 214 and 215 which are press fitted into suitable bores in the valve body. As in the case of the inlet valves the area beneath the respective bushings is counterbored at 216 and 217 and the ends of these counterbores opening through the bottom of the valve body, as viewed, are threaded to receive respective screw plugs 218 and 219. Respective stems 220 and 221 of the discharge valve member assemblies connect with pistons 222 and 223, which operate in respective cylinders 224 and 225 which terminate in counterbored sections 227 and 228 opening through the upper face of the valve body. A top plate 229 is provided with respective cavities 230 and 231 having annular O-ring receiving recesses 232 and 233 thereabout. Respective O-rings 234 and 235 fitted in these annular recesses seal the respective cavities 230 and 231 about respective counterbores 227 and 228 against the upper face of the valve body.

Figure 12:
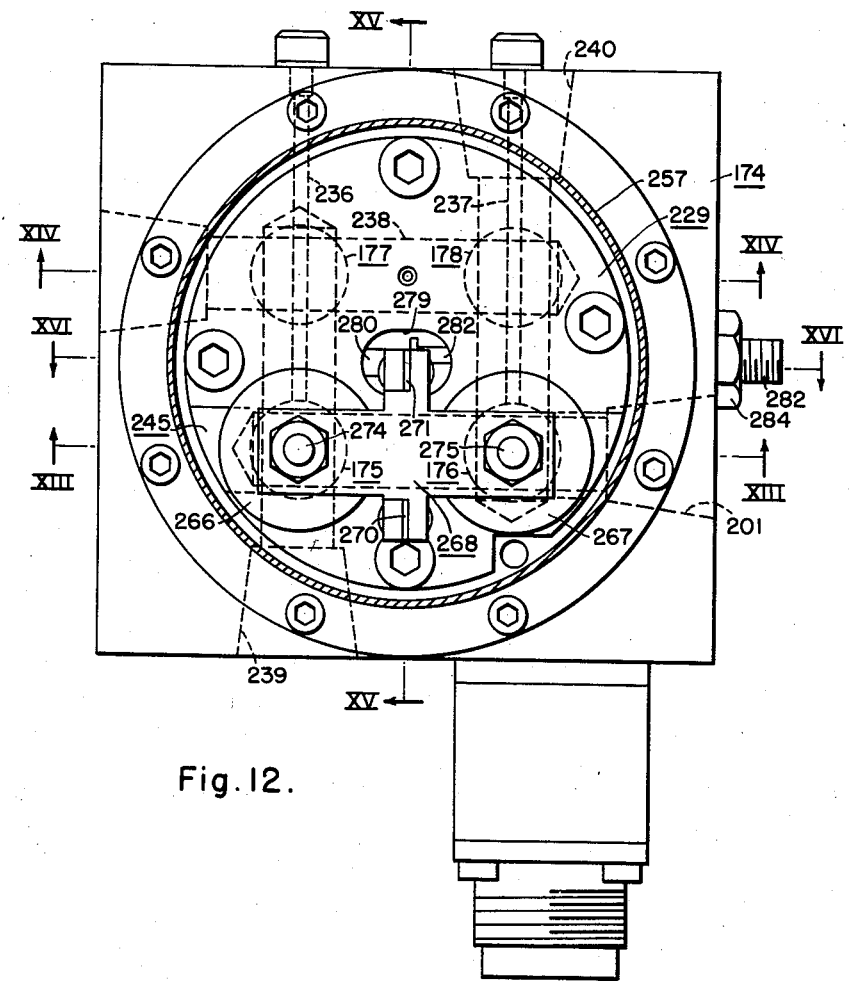
Fig. 12 is a plan view with the top cover in section of a second practical embodiment of this invention.
Figure 13:
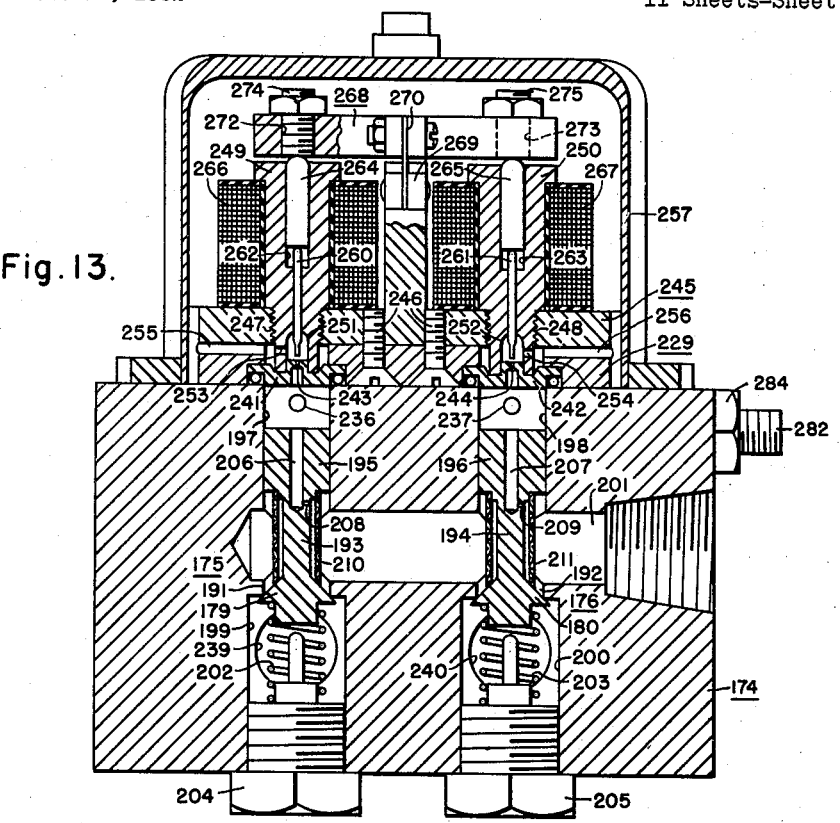
Fig. 13 is a sectional view of this second embodiment taken on the line XIII—XIII of Fig. 12.

Communication between the upper ends of the pistons of inlet valve 175 and discharge valve 177 is obtained by a passage 236, illustrated in both Figs. 13 and 14, and similarly a passage 237 affords communication between the upper ends of the pistons of inlet valve 176 and discharge valve 178. This passage forms part of the pilot pressure circuit controlled by the pilot valves, yet to be described. The respective discharge valves 177 and 178 communicate with a common passage 238 which opens through the side of the valve body and is adapted for connection to a sump such as illustrated in Fig. 1. The outlet port 191 of inlet valve 175 communicates with a passage 239 which extends through one end of the valve body, as seen in Fig. 12, and also connects with the inlet port of discharge valve 177. End views of this passage appear both in Figs. 13 and 14. In a similar manner, a passage 240 (see Figs. 12, 13 and 14) connects the outlet port of inlet valve 176 with the outlet port of discharge valve 178. This passage 240 extends through a side of the valve body opposite to that of passage 239. These respective passages may be termed the outlets of the valve system and are adapted for connection (see Fig. 1) to fluid conductors, such as 4 and 5, which connect to opposite ends of the hydraulic cylinder.

Thus, a complete hydraulic circuit is obtained wherein fluid from the accumulator which is admitted to passage 201 passes through one or the other of the respective inlet valves, for example inlet valve 175, to outlet passage 239 to one end of the cylinder of the hydraulic actuator. From the other side of the cylinder of the hydraulic actuator, fluid is exhausted into passage 240 and discharged through discharge valve 178 into passage 238 which is connected to the sump. From the sump, as shown in Fig. 1, fluid is taken by the pump and applied under pressure to the accumulator. If inlet valve 176 had been opened rather than inlet valve 175, fluid would pass therethrough to passage 240 into the end of the cylinder opposite to that previously considered and be exhausted from the cylinder into passage 239 to be discharged through discharge valve 177 into the sump.

The pilot valves, which control the pilot pressures applied to the pistons of the power valve, comprises respective valve bodies 241 and 242 which are secured in respective counterbores in top plate 229 over the ends of respective cylinders 197 and 198. Orifices 243 and 244 in the respective pilot valve bodies permit pilot pressure fluid to flow upwardly therethrough. In this application the magnetic controller again comprises an inverted T-shaped support 245 which is secured by screws 246 to a recessed section in top plate 229. Threaded holes 247 and 248 which are coaxially disposed of the pilot valve orifices threadedly receive the bottom ends of magnet cores 249 and 250, respectively. These respective magnetic cores are provided with respective open-ended cavities 251 and 252 in the bottom ends thereof which seat about the respective orifices 243 and 244. These cavities are vented by respective passages 253 and 254, opening through the sides thereof, communicating with respective passages 255 and 256 which pass laterally through the top plate 229 and exhaust into the space between the circumferential face of this plate and the cover 257, which is sealed thereabout, against the top face of the valve body 174.

The pilot valve discharge fluid which accumulates in this top cover is drained through coaxially disposed passages 258 and 259, respectively, through the top plate and valve body 174 into passage 238 which communicates with the sump.

The pilot valves are controlled by respective stems 260 and 261 which slide in vertical concentric bores in the respective magnet cores 249 and 250. The reduced diameter bottom ends of the respective stems 260 and 261 which are flat ended, present a face which is normal to the axis of the associated pilot valve orifices 243 or 244. These faces are of a diameter slightly larger than the pilot valve orifices to seat thereof, as required, and seal the valves. The upper ends of the respective stems 260 and 261 terminate in counterbores 262 and 263 in the associated magnet cores in which respective plungers 264 and 265 are slidably fitted.

Magnetizing coils 266 and 267 are fitted about the respective magnet cores. The actuating means of the magnetic controller or driver is represented in an armature assembly, generally designated 268, which is pivotally mounted, substantially at its center, to the top end of leg 269 of inverted T-shaped member 245 by means of respective flat springs 270 and 271. Threaded holes 272 and 273, which are respectively adjacent opposite ends of the armature assembly, are substantially coaxially disposed of the axis of respective plungers 264 and 265 and receive adjusting screws 274 and 275, respectively, the bottom ends of which abut the spherical upper ends of the respective plungers under operating conditions and thereby control the spacing of the flat bottom ends of the respective valve stems with respect to the pilot valve orifices to control fluid flow therethrough.

Figure 15:
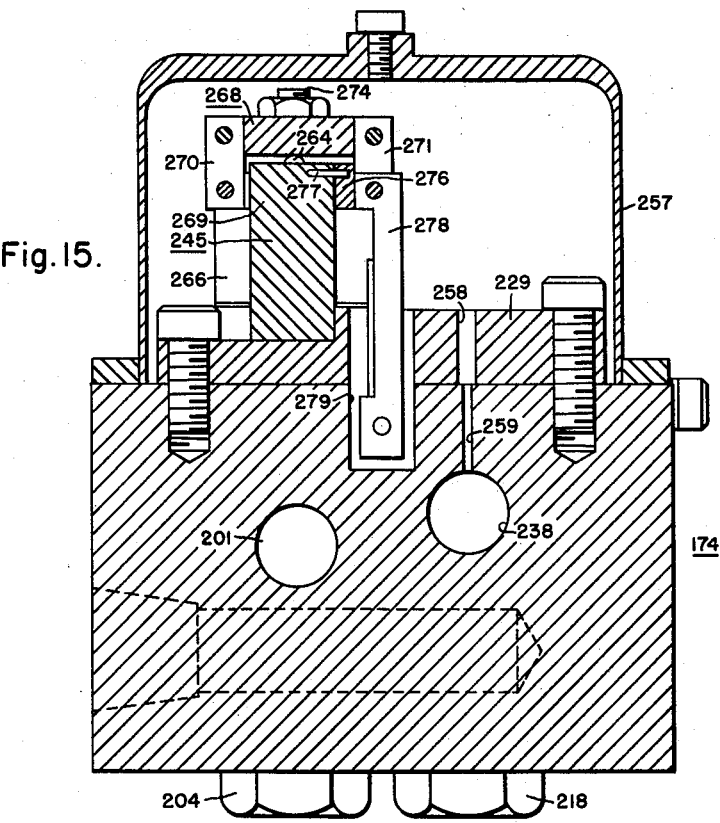
Fig. 15 is a sectional view of the valve taken on line XV—XV of Fig. 12.
Figure 16:
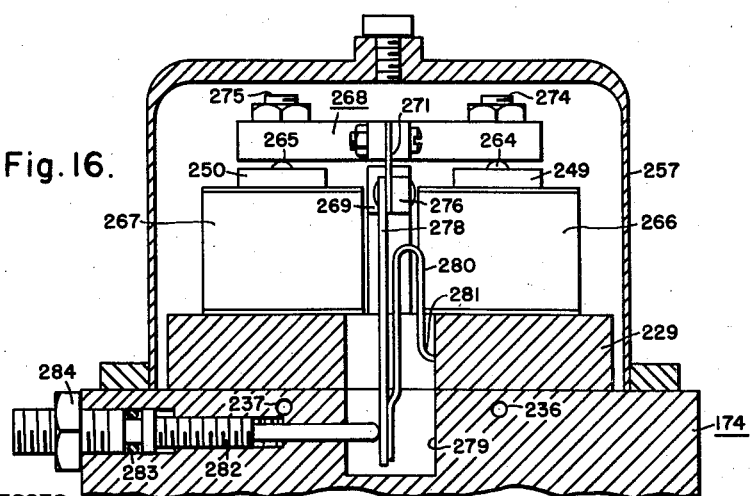
Fig. 16 is a sectional view of the top portion of the valve, as viewed, taken on the line XVI—XVI of Fig. 12.

Armature spring 271 is mounted on a pad 276 at its bottom end which is pivotally connected to the upper extremity of leg 269 of the inverted T-shaped member by means of a pivot pin 277. Also connected to pad 276 is a flat relatively non-flexible arm 278 which projects downwardly therefrom into a cavity 279 extending through the top plate 229 into the body of valve 174, as seen in Figs. 15 and 16. An inverted U-shaped spring member 280 is fastened to the bottom end of the arm 278, its other leg being deflected outwardly at 281 to abut one side of the cavity 279. An adjusting screw 282 is threaded into a suitable opening through the side of the valve body which opens into the cavity 279. The end of this adjusting screw abuts the lower end of arm 278 forcing this arm in a direction against the bias of U-shaped spring 280. A fluid-tight seal between the adjusting screw and the valve body is provided by means of O-ring 283 which is secured in a recess in the body of the screw. The screw is locked in any desired position by means of a nut 284 which threads over the end thereof projecting from the valve body. The use of this screw in displacing arm 278 against the bias of spring 280, turns pad 276 against pivot 277 and applies a deflecting force or a bending moment to flat spring 271 which mounts one side of the armature. This force applied through the armature to the other spring 270 forces angular displacement of the armature in such amount as may be needed so that the pilot valves may be adjusted to produce substantially equal pilot pressures under quiescent conditions. The spring mounting of the armature also provides a positive centering means which is opposed to the negative stiffness of the magnets. Such features as this, together with the damping of the pilot valves afforded by the two-piece construction in the operating means represented in the pilot valve stems and associated plungers, will be discussed at a later point.

It will be appreciated from an examination of the embodiment of Figs. 12–16 that this valve is applicable in all of the systems considered in conjunction with the preceding embodiment or in any system to which the preceding embodiment may be applied.

The functional aspect of the valve may be better appreciated by considering in detail the functional aspects of a magnetic driver or controller in a system such as illustrated in the embodiment of Figs. 6–11.

Under quiescent conditions, equal average currents in the coils of the symmetrical magnet supply polarizing flux to the magnetic driver. Assuming geometric and magnetic symmetry, the magnetic forces will be in equilibrium when the armature is centered with equal air gaps. If the armature of the magnetic controller or driver is displaced from the balanced position described, the flux increases in the magnetic circuit branch having the decreasing air gap between the core and armature and decreases in the other branch producing a torque in the direction of the displacement. The fluxes in these branches of the magnetic circuit vary inversely as the air gaps and the armature forces vary as the square of the fluxes to produce a net torque which is proportional to the square of the armature displacement at the air gaps. If this is considered as a centering effect, this square law stiffness is negative in sign, that is, the greater the displacement of the armature from centered position, the greater is the net torque which therefore holds the armature from its centered position.

Assuming that the pilot valves are adjusted for equal average openings when the armature is centered, which openings as a practical matter are not less than ⅛ the diameter of the orifices of the pilot valves at the armature position for which the air gaps are equal, as the armature is displaced, the pilot valve stems which bear against it are also displaced. In that branch of the control circuit in which the pilot valve is closing, the pressure rises and in the other branch the pilot pressure drops.

With average biasing current of the correct magnitude, the positive hydraulic stiffness is higher than the negative magnetic stiffness, if the average valve gap is smaller than the average magnetic air gap on the basis considered at an earlier point. If these conditions obtain, the net stiffness is positive and the valve centers to equalize control pressures.

However, this condition may not be realized in practice due to certain effects, such as fringing and local spot area saturation in the magnetic circuit which alter the flux pattern, but more appreciable deviations may occur in the hydraulic circuit. These deviations may be accounted for, at least in part, by the effect of the power valve system on the dynamics of the pilot valve. The volume rates of fluid past the valves is altered by the motion of the power valve piston operators in a sense to augment the flow past the pilot valve whose opening or orifice area is increasing and to diminish the flow past the other valve whose area is decreasing. This may be understood by reference to Fig. 1 wherein assuming counterclockwise tilting of armature 44, the area of the orifice of pilot valve 33c is increasing as that of pilot valve 32c is decreasing. Under this condition, the piston 10 of inlet valve 6 is displaced to the left, as viewed, which increases the volume of the pilot pressure circuit associated therewith and conversely due to displacement of the piston of discharge valve 9 to the left, as viewed, the volume of the pilot circuit associated therewith is decreased. During this transient condition, the volume rate of fluid flow through pilot valve 33c is augmented by displacement of the piston of discharge valve 9 into the pilot pressure circuit while, at the same time, due to the volume increase in the pilot pressure circuit associated with pilot valve 32c, a slight decrease in volume rate of fluid transfer through the pilot valve 32c occurs. The effect of this situation produces a dynamic reduction of the steady-state positive stiffness described above.

The positive stiffness may further be impaired by the flow patterns past the valves. The flow patterns are such that effective pilot valve area reduction occurs as a function of the volume rate and linear velocity of fluid past the valves.

A third effect affecting positive valve stiffness is the forces arising from the flow of fluid through the orifice and impinging on the pilot valve end face. This force is a function of the volume rate and fluid velocity.

These dynamic stiffness effects may be relatively quite large and their effect in the system may be minimized by reducing the average biasing current on the magnet coil which embodies a requirement for class B pilot control signals rather than class A, which is generally more desirable, or the magnetic air gap may be increased to several times the pilot valve opening so that the magnetic negative stiffness is reduced in order that the pilot valves may be positively centered.

These three factors also introduce negative damping to the pilot valves. The negative damping is effected by the pilot valve dimensions and configurations, operating pressures and constants of the operating pistons of the power valves and their associated loads. It can produce a condition of valve singing usually at high frequency to produce control circuit pressure modulations that can be very undesirable. The general conditions above referred to may be better understood by recalling the considerations made with regard to the positive damping of the power valves.

In the power valve system, the flow direction of the hydraulic fluid was described as being in the direction of valve opening movement. The ultimate effect of this condition, referring, for example, to inlet valve 6 in which the fluid flow direction is as indicated by arrow 70, was to produce an effective reduction in area seen by the supply fluid pressure coming in at inlet port 14 and acting on the back face of valve member 56 and the confronting face of piston 10 so that the valve tended to close when the pressure in outlet conductor 36 approached the pilot pressure. This is a very desirable condition in this instance since it provides positive seating of the valve.

In the case of the control of the pilot valves afforded by the magnetic driver, the condition is different. The flow direction of the pilot pressure fluid through the respective pilot valves is again in a direction of valve opening movement, and, therefore, as one of the pilot valves approaches closed position due to the driving force of the armature, the tendency of the valve to close due to the dynamic flow characteristics as described, may result in complete closing of the valve. The force to close the valve under dynamic flow conditions is less than the force required to hold the valve closed when the flow of fluid stops. If the armature force is just below the required force to hold the valve closed, the fluid force acting on the valve stem forces the valve open, and the dynamic flow conditions again obtain and the armature force closes the valve. Thus, a condition of oscillation of the pilot valve system and its driver is initiated and will take place at a frequency depending primarily on the inertia of the moving parts and the forces which are acting on them. This dynamic flow condition, when considered with the geometry of the magnetic driver, is, therefore, a condition of negative damping with respect to valve stem motions.

The negative damping may be cancelled by applying a positive damper to the armature of the magnetic driver having an equal or higher damping rate. Such cancellation, while effective, is not uniform since the negative damping rate is not linear. Therefore, as a general proposition, a high positive damping rate at the armature is required in excess of the maximum negative damping rate to achieve stability. If the positive damping is excessive, the armature travel in response to control signals will be delayed, thereby impairing the over-all speed of response of the valve. Stable performance is obtainable in this manner for certain applications not requiring high speeds of response.

Pilot valve stability in the presence of negative damping may be improved in another manner, namely, by the addition of auxiliary mechanical springs about the armature rotational axis. This expedient is illustrated in the embodiment of Figs. 6–11 and in the embodiment of Figs. 12–16. Such centering springs reduce the relative magnitude of the negative stiffness and tend to restrain the induced valve motions to zones in which the negative damping rates are less than otherwise encountered. Auxiliary centering springs also improve the armature positional accuracy under quiescent conditions since the linearity of the mechanical springs prevents the centering stiffness from approaching zero at the armature equilibrium position. The springs may be biased as illustrated in the embodiment of Figs. 6–11 to compensate for any valve or circuit irregularities which will produce output pressure differences for quiescent conditions if uncorrected.

However, the auxiliary or centering springs may adversely effect the linearity of pilot valve response. Generally, the valve clearance is adjusted for class C operation in order to obtain lower quiescent output pressure, in which case, about the equilibrium position armature travel per unit pressure change is higher than at either end position. The mechanical spring rate is, of course, linear and correspondingly absorbs a larger portion of the applied signal force at low levels than at higher signal amplitudes. Accordingly, the pilot valve system will tend to be less sensitive about the balanced position than at either limit of pressure range. This non-linear sensitivity produces a distortion that on a sinusoidal input signal results in a peaked wave form of pressure output. Here again, however, acceptable performance has been obtained for some applications.

A presently preferred solution to the problems of pilot valve stability and positional centering accuracy has been illustrated in Figs. 12–16 and involves using both auxiliary springs on the armature and viscous damping on the moving pilot valve members or stems. Optimum valve performance has been obtained with this combination which permits, in general, very appreciably lower damping rates and stiffness rates with corresponding shorter time delays and minimum wave form distortion than when either is used alone. Application of these principles to the pilot valve system produces an over-all power valve control which is very fast with good response linearity and which presents no valve stability difficulties.

Considering these features in more detail in Figs. 12–16, it will be recalled that each valve stem and push rod or plunger for the pilot valves is made in two sections of different diameters, each fitting into guide bores having the same nominal diameters. They are maintained in compressive contact by the fluid forces on the valve stem working against the armature. If the right side of the armature, as viewed in Fig. 13, raises, the cavity at the junction of the two rods expands. The upper end of the valve stem 261 operates immersed in the hydraulic fluid which is drawn into the cavity thereabout past the clearance between the plunger 265 and its bore and the valve stem 261 and the bore in which it operates. For opposite armature motion, the cavity is diminished in volume by downward movement of plunger 265 which expels the fluid from the cavity in a manner similar to that in which it was drawn into the cavity.

Damping is provided that is essentially linear for a definite fluid viscosity since the relatively long leakage paths about the stem and plunger have linear viscous flow characteristics. The damping rate, again for a definite viscosity, is determined by the differential areas of the rods and the length and clearance of the rods in their bores.

Mechanical springs may be coupled to the armature in any conventional manner that avoids adding rotational friction to the movement of the armature. These springs may, as illustrated in the final embodiment of this invention, form the hinges on which the armature pivots. With the arrangement illustrated, some friction is added since the armature translates laterally relative to the valve push rods due primarily to the pivoted connection to one of the spring mounting pads on the leg of the core. However, the magnitude of the friction thus developed is low since the versine for small angles of armature travel is negligible.

From the foregoing description, it will be appreciated that valve mechanisms and systems have herein been provided which are relatively simple in construction with respect to operational requirements and which utilize physical components, such as the piston-operated seated-type valves, which are not critical in dimension and which, therefore, facilitate the construction. Moreover, such valve arrangements provide a positive seal of the oil or hydraulic fluid at any of the power valves which measurably improves the performance of the system and moreover results in a structure having a long useful life with a minimum of maintenance. Additionally, all valve linkages are achieved by means of hydraulic fluid which means that the valves are self-adjusting, requiring no precise control of dimensions among mechanically connected valve parts or touchy adjustments which must be made during assembly, as in the case of spool valves which require exact fitting at the lands and close dimension control among mechanically connected components. Still further, the provision of the hydraulic linkage and the general geometry of the hydraulic system provides a system which is inherently force sensitive.

All of the embodiments of this invention illustrate valve arrangements incorporating 1:1 ratio between pilot pressures and output pressures. If an application requires some other ratio, this is conveniently obtained by correspondingly ratioing the areas of a piston assembly for a power valve such as 6, for instance, so that the piston force due to output pressure is suitably related to the piston force due to pilot pressure. As a practical proposition, this may require the use of two pistons on a valve stem such as 58 in valve 6, one of which is subject to output pressure and the other of which is subject to pilot pressure.

Additionally, all of the embodiments of the invention hereinbefore illustrated show hydraulic valve arrangements affording a reversible fluid output for the purpose of reversibly driving a load such as an aircraft control surface. Some applications do not require a reversible output of fluid pressure. Conventional hydraulic lifts are in this latter class.

For such an application, only half of the valve system is required. For example, referring to Fig. 1, if piston 1 were permanently loaded so as to be biased to the left, as viewed, then only inlet valve 6 and discharge valve 8 would be required to operate the piston. Any suitable pilot pressure control means may be employed to control pilot pressure at the control ports of the two valves.

To move the piston to the right, the pilot pressure is increased, which opens inlet valve 6 and more tightly closes discharge valve 8. The piston stroke to the right and stops when the load force on the right of the piston balances the force due to fluid pressure on the left.

To return the piston, the pilot pressure is reduced, which opens the discharge valve 8. This valve remains open until the pressure in outlet conductor 36 falls below the pilot pressure. Force sensitivity is inherent in this arrangement also.

It will be appreciated by those skilled in the art from a study of the several embodiments herein illustrated and described that numerous other variations in the disclosed subject matter, both as to construction and organization, may be made without departing from the spirit and scope of this invention. Accordingly, it is intended that the foregoing disclosure and the illustrations of the drawings shall be interpreted only as illustrative of the principles of this invention and not construed in a limiting sense.

We claim as our invention:

1. Hydraulic apparatus comprising, respective pressure-responsive supply valves each having separate pressure control areas and respective outlet conductors, said supply valves tending to close in response to outlet pressure, respective pressure-responsive discharge valves connected to said respective outlet conductors to receive fluid therefrom, each said discharge valves having separate pressure control areas, said discharge valves tending to open in response to outlet pressure, respective pilot pressure conductors, one pilot perssure conductor being connected to apply pressure separately to said pressure control areas of each one pair of discharge and supply valves connected to one outlet conductor and the other pilot pressure conductor being connected to apply pressure separately to said pressure control areas of each of the remaining supply and discharge valves connected to the remaining outlet conductor, said pilot pressure tending to open the supply valves and close the discharge valves, respective controllable pilot pressure valves connected in each pilot pressure conductor, and means for controlling said pilot pressure valves in opposite senses to cause an increase in pilot pressure to the supply valve of one pair causing it to open while at the same time reducing pilot pressure to the discharge valve of the other pair causing it to open.

2. Hydraulic apparatus comprising, respective pressure-responsive supply valves each having separate pressure control areas and respective outlet conductors, said supply valves tending to close in response to outlet pressure, respective pressure-responsive discharge valves connected to said respective outlet conductors to receive fluid therefrom, each said discharge valves having separate pressure control areas, said discharge valves tending to open in response to outlet pressure, respective pilot pressure conductors, one pilot pressure conductor being connected to apply pressure separately to said pressure control areas of each one pair of discharge and supply valves connected to one outlet conductor and the other pilot pressure conductor being connected to apply pressure separately to said pressure control areas of each of the remaining supply and discharge valves connected to the remaining outlet conductor, said pilot pressure tending to open the supply valves and close the discharge valves, respective pilot pressure valves connected in each pilot pressure conductor, and electromagnetic means for simultaneously moving one pilot pressure valve toward closed position and moving the other pilot pressure valve toward open position, causing the supply valve of one pair to open due to increased pressure and the discharge valve of the other pair to open due to decreased pressure.

3. Hydraulic apparatus comprising, inlet fluid conductor means, a pair of outlet fluid conductors, respective pressure-responsive supply valves connected between the respective outlet conductors and the inlet conductor means, respective pressure-responsive discharge valves connected to the respective outlet conductors, pressure control areas on said pressure-responsive supply and discharge valves, fluid pressure in said outlet conductors tending to close the respective supply valves and tending to open the respective discharge valves, and means for applying a variable pilot pressure separately to all said valve control areas in a sense tending to close said discharge valves and open said supply valves.

4. Hydraulic apparatus comprising, inlet fluid conductor means, a pair of outlet fluid conductors, respective pressure-responsive supply valves connected between the respective outlet conductors and the inlet conductor means, respective pressure-responsive discharge valves connected to the respective outlet conductors, pressure control areas on said pressure-responsive supply and discharge valves, fluid pressure in said outlet conductors tending to close the respective supply valves and tending to open the respective discharge valves, means for separately applying a variable pilot pressure to said pressure control areas of all said valves in a sense tending to close said discharge valves and open said supply valves, and means for separately increasing the pilot pressure applied to said control areas of a supply valve and a discharge valve connected to one outlet conductor while separately decreasing the pilot pressure applied to said control areas of the remaining discharge valve and supply valve.

5. Hydraulic apparatus comprising, inlet fluid conductor means, a pair of outlet fluid conductors, respective pressure-responsive supply valves connected between the respective outlet conductors and the inlet conductor means, respective pressure-responsive discharge valves connected to the respective outlet conductors, pressure control areas on said pressure-responsive supply and discharge valves, fluid pressure in said outlet conductors tending to close the respective supply valves and tending to open the respective discharge valves, a first pilot pressure conductor connecting said inlet fluid conductor means to the control area of a supply valve and to the control area of a discharge valve connected to one outlet conductor, a second pilot pressure conductor connecting said inlet fluid conductor means to the control areas of the remaining supply and discharge valves, said pilot pressure being separately applied to said control areas tending to open said supply valves and close said discharge valves, and respective pilot pressure valve means in each pilot pressure conductor for controlling the fluid pressure therein.

6. Hydraulic apparatus comprising, inlet fluid conductor means, a pair of outlet fluid conductors, respective pressure-responsive supply valves connected between the respective outlet conductors and the inlet fluid conductor means, respective pressure-responsive discharge valves connected to the respective outlet conductors, pressure control areas on said pressure-responsive supply and discharge valves, fluid pressure in said outlet conductors tending to close the respective supply valves and tending to open the respective discharge valves, a first pilot pressure conductor connecting said inlet fluid conductor means to the control area of a supply valve and to the control area of a discharge valve connected to one outlet conductor, a second pilot pressure conductor connecting said inlet fluid conductor means to the control areas of the remaining supply and discharge valves, said pilot pressure being separately applied to said control areas tending to open said supply valves and close said discharge valves, respective pilot pressure valve means in each pilot pressure conductor for controlling the fluid pressure therein, and control means connected with each pilot pressure valve means for moving one pilot pressure valve means toward closed position as the other pilot pressure valve means is moved away from closed position.

7. Hydraulic apparatus comprising, inlet fluid conductor means, a pair of outlet fluid conductors, respective pressure-responsive supply valves connected between the respective outlet conductors and the inlet fluid conductor means, respective pressure-responsive discharge valves connected to the respective outlet conductors, pressure control areas on said pressure-responsive supply and discharge valves, fluid pressure in said outlet conductors tending to close the respective supply valves and tending to open the respective discharge valves, a first pilot pressure conductor connecting said inlet fluid conductor means to the control area of a supply valve and to the control area of a discharge valve connected to one outlet conductor, a second pilot pressure conductor connecting said inlet fluid conductor means to the control areas of the remaining supply and discharge valves, said pilot pressure being separately applied to said control areas tending to open said supply valves and close said discharge valves, respective pilot pressure valve means in each pilot pressure conductor for controlling the fluid pressure therein, and control means connected with each pilot pressure valve means for selectively operating the respective pilot pressure valve means.

8. Hydraulic apparatus comprising, an inlet fluid conductor, a pair of outlet fluid conductors, respective pressure-responsive supply valves connected between the respective outlet conductors and the inlet conductor, respective pressure-responsive discharge valves connected to the respective outlet conductors, pressure control areas on said pressure-responsive supply and discharge valves, fluid pressure in said outlet conductors tending to close the respective supply valves and tending to open the respective discharge valves, a first pilot pressure conductor connecting said inlet fluid conductor to the control area of a supply valve and to the control area of a discharge valve connected to one outlet conductor, a second pilot pressure conductor connecting said inlet fluid conductor to the control areas of the remaining supply and discharge valves, said pilot pressure being separately applied to said control areas tending to open said supply valves and close said discharge valves, respective pilot pressure valve means in each pilot pressure conductor for controlling the fluid pressure therein, a magnetic controller comprising a pivotally mounted armature connected to said pilot pressure valves to operate said valves in opposite senses, and coil means on said magnetic controller for controlling said armature.

9. A two stage hydraulic valve for controlling a reversible hydraulic actuator, comprising two pilot valves for determining two control pressures, a first inlet power valve, a first outlet power valve, said first inlet and first outlet valves being separately biased in one direction by one of said two control pressures of said two pilot valves to establish an outlet pressure, said first inlet and first outlet valves being additionally biased in the opposite direction by said outlet pressure, a second inlet power valve, a second outlet power valve, said second inlet and second outlet power valves being separately biased in one direction by the other of said two control pressures of said two pilot valves to establish a second outlet pressure, said second inlet and second outlet valves being additionally biased in the opposite direction by said second outlet pressure, each of said inlet and outlet valves being responsive to the differential of said power and control pressures for open or closed positions.

10. A force responsive fluid pressure valve system for controlling fluid pressure in oppositely variable volumes of a hydraulic actuator comprising, an inlet pressure conductor, a pair of outlet conductors respectively adapted for connection to said oppositely variable volumes, a pair of pressure responsive supply power valves connecting said respective outlet conductors to said inlet pressure conductor, a separate pressure responsive area on each of said supply power valves, a pair of pressure responsive discharge valves respectively connected to said outlet conductors for exhausting said outlet conductors, a separate pressure responsive area on each of said discharge valves, a pair of pilot pressure conductors respectively connected to the pressure responsive areas of a supply valve and a discharge valve connected to a common outlet conductor, means for applying quiescent pilot pressure in said pilot pressure conductors to separately bias said supply valves toward open position and to separately bias said discharge valves toward closed position, means associated with each power valve and responsive to inlet fluid pressure for biasing each power valve in opposition to said pilot pressure bias and in an amount substantially equal to the quiescent pilot pressure on the respective power valves, and means for varying said pilot pressures in opposite senses.

11. A fluid pressure responsive valve system comprising, a pair of outlet conductors adapted for connection to oppositely variable fluid volumes, four pressure responsive power valves connected in respective pairs to said outlet conductors, each of said four pressure responsive power valves having separate pressure responsive areas, the valves of the respective pairs comprising an admission valve and an exhaust valve, and arranged to admit inlet pressure and exhaust fluid pressure from said respective outlet conductors, respective pilot pressure means for applying substantially equal given values of pilot pressure to said separate pressure responsive areas of said pairs of power valves and arranged to bias said admission valve toward open position and said discharge valves toward closed position, means connected with each valve and responsive to inlet pressure for biasing said power valves in opposition to said pilot pressure, and means for varying said respective pilot pressure means in opposite senses.

12. A fluid pressure responsive valve system comprising, a pair of outlet conductors adapted for connection to oppositely variable fluid volumes, four pressure responsive power valves connected in respective pairs to said outlet conductors, each of said four pressure responsive power valves having separate pressure responsive areas, the valves of the respective pairs comprising an admission valve and an exhaust valve, and arranged to admit inlet pressure and exhaust fluid pressure from said respective outlet conductors, respective pilot pressure means for applying substantially equal given values of pilot pressure to said separate pressure responsive areas of said pairs of power valves and arranged to bias said admission valves toward open position and said discharge valves toward closed position, means connected with each valve and responsive to inlet pressure for biasing said power valves in opposition to said pilot pressure, and means for varying said respective pilot pressure means in opposite senses, said means responsive to inlet pressure applying a bias to said power valves substantially equal and opposite to the pilot pressure bias thereon.

13. Hydraulic apparatus comprising, a pressure-responsive supply valve having a pressure-responsive area means adapted to pass fluid therethrough, an outlet conductor connected to receive fluid from said supply valve, a pressure-responsive discharge valve having a pressure-responsive area means connected to said outlet conductor, pressure in said outlet conductor tending to close said supply valve and open said discharge valve, a fluid conductor connected to each valve for applying pressure to each of said pressure-responsive area means in the opposite direction from that due to outlet fluid pressure, said fluid conductor having a discharge opening, a pilot valve for connecting said fluid conductor to a supply of fluid under pressure, and means for opening and closing said pilot valve.

14. Hydraulic apparatus comprising, a pressure-responsive supply valve having a pressure-responsive area means adapted to pass fluid therethrough, an outlet conductor connected to receive fluid from said supply valve, a pressure-responsive discharge valve having a pressure-responsive area means connected to said outlet conductor, pressure in said outlet conductor tending to close said supply valve and open said discharge valve, a fluid conductor connected to each valve for applying pressure to each of said pressure-responsive area means in the opposite direction from that due to outlet fluid pressure, said fluid conductor having a discharge opening, a pilot valve for connecting said fluid conductor to a supply of fluid under pressure, and electromagnetic means having an armature connected to said pilot valve for opening and closing said pilot valve.

15. A force sensitive fluid operated valve assembly comprising, a supply valve assembly including a piston operated supply valve member having a piston end and a valve end with substantially 1:1 area ratio therebetween, a supply valve housing slidably receiving said piston and having an inlet port intermediate said piston end and valve end of said supply valve member, an outlet port at said valve end and a control port at said piston end; a discharge valve assembly including a piston operated discharge valve member having a piston end and a valve end with substantially 1:1 area ratio therebetween, a discharge valve housing slidably receiving said piston and having an inlet port at said valve end of said discharge valve member communicating with said outlet port of said supply valve, an exhaust port between said piston end and said valve end of said discharge valve member and having a control port at said discharge valve member piston end; a seated type of pilot valve having an outlet port connected to both of said control ports to apply fluid pressure to said supply valve to open said supply valve and to said discharge valve to close said discharge valve, and means connected with said pilot valve to control the operational position thereof over the range between fully closed and fully opened positions to correspondingly control the fluid pressure applied to both of said control ports.

16. A force sensitive fluid operated valve system comprising, an inlet pressure fluid conductor, an outlet fluid conductor and an exhaust fluid conductor, a supply valve having a movable seated type piston operated valve member connected to control fluid flow from said inlet pressure fluid conductor to said outlet fluid conductor, said supply valve having a valve area subject to outlet conductor pressure, said inlet pressure being applied to said supply valve in the direction of valve opening motion, a discharge valve having a movable seated type piston operated valve member connected to control fluid flow from said outlet fluid conductor to said exhaust fluid conductor, fluid pressure in said outlet fluid conductor being applied to an area of said discharge valve in the direction of valve opening motion, a pilot pressure fluid conductor connected to both of said valves for applying pilot pressure to said pistons in a sense to open said supply valve and close said discharge valve, a seated type pilot valve connecting said pilot pressure fluid conductor to said inlet pressure fluid conductor, means providing communication between said pilot pressure fluid conductor and said exhaust fluid conductor whereby pilot pressure drops toward exhaust pressure when said pilot valve is closed to correspondingly reduce fluid pressure in said outlet fluid conductor.

17. A force sensitive fluid operated valve system comprising, an inlet pressure fluid conductor, an outlet fluid conductor and an exhaust fluid conductor, a supply valve having a movable seated type piston operated valve member connected to control fluid flow from said inlet pressure fluid conductor to said outlet fluid conductor, said supply valve having a valve area subject to outlet conductor pressure, said inlet pressure being applied to said supply valve in the direction of valve opening motion, a discharge valve having a movable seated type piston operated valve member connected to control fluid flow from said outlet fluid conductor to said exhaust fluid conductor, fluid pressure in said outlet fluid conductor being applied to an area of said discharge valve in the direction of valve opening motion, a pilot pressure fluid conductor connected to both of said valves for applying pilot pressure to said pistons in a sense to open said supply valve and close said discharge valve, a seated type pilot valve connecting said pilot pressure fluid conductor to said inlet pressure fluid conductor, means providing communication between said pilot pressure fluid conductor and said exhaust fluid conductor whereby pilot pressure drops toward exhaust pressure when said pilot valve is closed to correspondingly reduce fluid pressure in said outlet fluid conductor, the area of said movable discharge valve member subject to outlet pressure is in one to one ratio with the area thereof subject to pilot pressure and the area of said movable supply valve member subject to outlet pressure is in one to one ratio with the area thereof subject to pilot pressure.

18. Hydraulic control apparatus comprising, an inlet conductor, an outlet conductor adapted for connection to a fluid responsive member to be controlled, a supply valve connected between said inlet and outlet conductors, first piston means on said supply valve responsive to fluid pressure in said inlet conductor for biasing said supply valve toward closed position, second piston means on said supply valve for biasing said valve toward open position, a discharge valve connected to said outlet conductor, first piston means on said discharge valve responsive to fluid pressure in said inlet conductor for biasing said discharge valve toward open position, second piston means on said discharge valve for biasing said discharge valve toward closed position, fluid conducting means connected with said respective second pistons, and valve means for regulating the application of fluid pressure to said second pistons.

19. A force responsive fluid pressure valve system comprising, an inlet pressure conductor, an outlet pressure conductor, a pressure responsive supply valve having a movable valve member, connecting said inlet pressure conductor to said outlet conductor; a pressure-responsive discharge valve having a movable valve member connected to said outlet conductor to exhaust said outlet conductor; an auxiliary piston connected to each valve member and responsive to inlet pressure and disposed to bias the movable valve member of said supply valve to closed position and disposed to bias the valve member of said discharge valve toward open position, a pilot pressure piston on each valve member opposed to the associated auxiliary piston, and means for applying controllable pressure to said pilot pressure pistons.

20. A force responsive fluid pressure valve system comprising, an inlet pressure conductor, an outlet pressure conductor, a supply valve connected between said inlet pressure conductor and said outlet conductor and having a movable valve member controlling admission of inlet pressure to said outlet conductor, a discharge valve connected to said outlet conductor for exhausting said outlet conductor and having a movable valve member controlling exhausting of said outlet conductor, a pilot pressure conductor connected with both said valve members for pressure biasing said supply valve member toward open position and pressure biasing said discharge valve member toward closed position, means connected with each of said valve members and responsive to inlet pressure for biasing said valve members in opposition to said pilot pressure bias, and valve means connecting said pilot pressure conductor with said inlet conductor for controlling the pilot pressure in said pilot pressure conductor.

References Cited in the file of this patent

UNITED STATES PATENTS

| | | |
|---|---|---|
| 587,786 | Brown | Aug. 10, 1897 |
| 752,491 | Warren | Feb. 16, 1904 |
| 1,611,961 | Thompson | Dec. 28, 1926 |
| 1,950,749 | Ross | Mar. 13, 1934 |
| 1,986,429 | Dunham | Jan. 1, 1935 |
| 2,020,773 | Ernst | Nov. 12, 1935 |
| 2,208,421 | Hanna | July 16, 1940 |
| 2,249,206 | Hubbard | July 15, 1941 |
| 2,306,346 | Rockwell | Dec. 22, 1942 |
| 2,408,770 | Frische et al. | Oct. 8, 1946 |
| 2,473,038 | Rockwell | June 14, 1949 |
| 2,520,944 | Lynn et al. | Sept. 5, 1950 |
| 2,569,014 | Martin | Sept. 25, 1951 |
| 2,630,828 | Bent | Mar. 10, 1953 |
| 2,633,871 | Parsons | Apr. 7, 1953 |
| 2,672,731 | Ashton | Mar. 23, 1954 |
| 2,700,397 | Compton | Jan. 25, 1955 |
| 2,700,986 | Gunn | Feb. 1, 1955 |